US009459828B2

(12) United States Patent
Ales

(10) Patent No.: US 9,459,828 B2
(45) Date of Patent: *Oct. 4, 2016

(54) MUSICALLY CONTEXTUAL AUDIO ADVERTISEMENTS

(71) Applicant: Brian K. Ales, New York, NY (US)

(72) Inventor: Brian K. Ales, New York, NY (US)

(73) Assignee: Brian K. Ales, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,656

(22) Filed: Feb. 25, 2016

(65) Prior Publication Data

US 2016/0239876 A1 Aug. 18, 2016

Related U.S. Application Data

(63) Continuation-in-part of application No. 14/147,050, filed on Jan. 3, 2014, now Pat. No. 9,355,627, which is a continuation of application No. 13/943,465, filed on Jul. 16, 2013, now abandoned.

(60) Provisional application No. 61/671,953, filed on Jul. 16, 2012.

(51) Int. Cl.
*G06F 17/00* (2006.01)
*G06F 3/16* (2006.01)
*G10H 1/00* (2006.01)

(52) U.S. Cl.
CPC ............ *G06F 3/165* (2013.01); *G10H 1/0025* (2013.01)

(58) Field of Classification Search
CPC ................... G10H 1/0025; G10H 2210/0176; G10H 2210/125; G10H 2240/131
See application file for complete search history.

(56) References Cited

U.S. PATENT DOCUMENTS

| 5,919,047 | A | 7/1999 | Sone |
| 6,410,837 | B2 | 6/2002 | Tsutsumi et al. |
| 7,078,607 | B2 | 7/2006 | Alferness et al. |
| 7,319,185 | B1 | 1/2008 | Wieder et al. |
| 7,626,112 | B2 | 12/2009 | Miyajima et al. |
| 7,842,874 | B2 | 11/2010 | Jehan et al. |
| 8,487,176 | B1 | 7/2013 | Wieder et al. |
| 8,525,012 | B1 | 9/2013 | Yang |
| 9,355,627 | B2 * | 5/2016 | Ales ....................... G11B 20/10 |

(Continued)

OTHER PUBLICATIONS

USPTO, U.S. Appl. No. 13/943,465 Non-Final Office Action mailed Apr. 8, 2009, 8 Pages.

(Continued)

*Primary Examiner* — Andrew C Flanders
(74) *Attorney, Agent, or Firm* — Strategic Patents, P.C.

(57) ABSTRACT

Audio advertisements for music services can be created and played to minimize any perceived discontinuity by a listener from a preceding song. Specifically, a voice-over content item (e.g., a spoken advertisement produced without music) may combined with a non-song musical content item (e.g., backing music specifically produced for advertisements) to create an audio advertisement to be played after a song on a streaming music service. The non-song musical content item may be selected based on its similarity to the preceding song (e.g., genre, tempo, or harmony) and/or a musical preference of a user (e.g., a preferred genre obtained through a user's music service account and/or selected by the user). The genre of both the preceding song and a musical preference of a user may be used to select a non-song musical content item genre by a weighting that determines the probability of the genre used for an advertisement.

20 Claims, 20 Drawing Sheets

(56) References Cited

U.S. PATENT DOCUMENTS

| | | |
|---|---|---|
| 2001/0039872 A1 | 11/2001 | Cliff |
| 2004/0112202 A1 | 6/2004 | Smith et al. |
| 2009/0019995 A1 | 1/2009 | Miyajima et al. |
| 2010/0293455 A1 | 11/2010 | Bloch et al. |
| 2011/0145370 A1 | 6/2011 | Nieuwenhuys et al. |
| 2011/0200116 A1 | 8/2011 | Bloch et al. |

OTHER PUBLICATIONS

USPTO, U.S. Appl. No. 14/147,050 Final Office Action mailed Jan. 25, 2016, 23 pages.
USPTO, U.S. Appl. No. 14/147,050 Non-Final Office Action mailed May 18, 2015, 11 pages.
USPTO, U.S. Appl. No. 14/147,050 Notice of Allowance mailed Mar. 28, 2016, 5 pages.

* cited by examiner

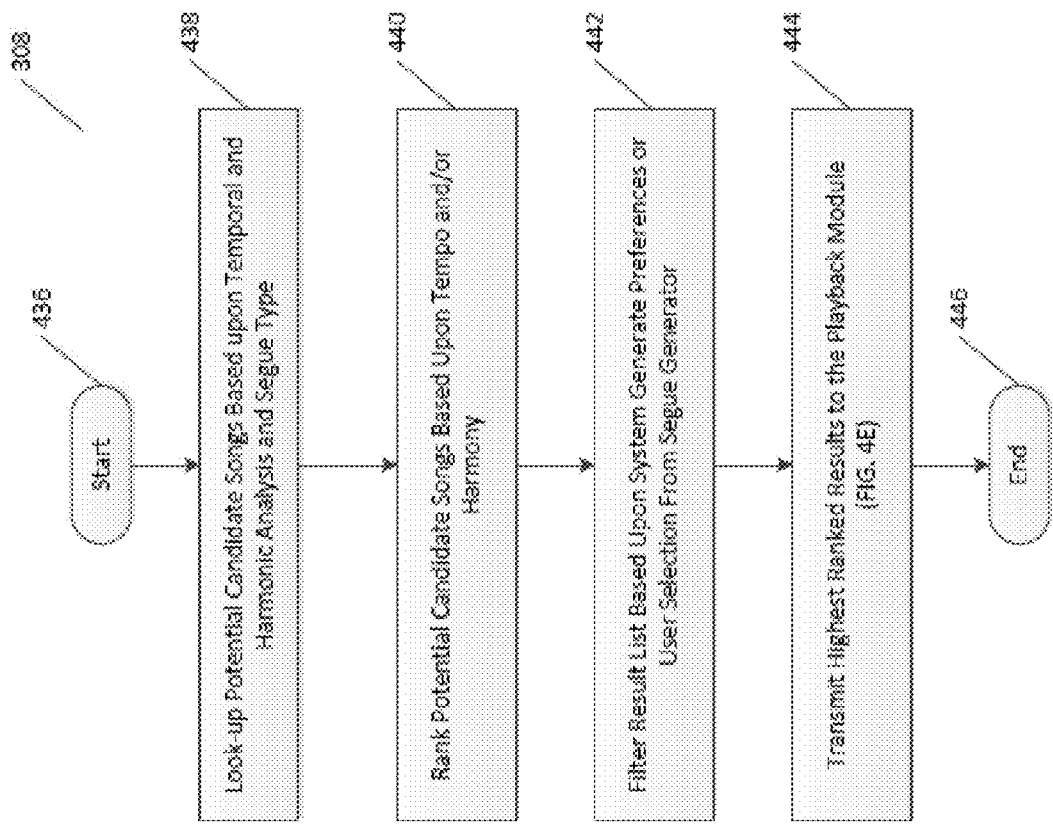

MUSICALLY CONTEXTUAL AUDIO ADVERTISEMENTS

CROSS-REFERENCE TO RELATED APPLICATIONS

This application is a continuation-in-part of U.S. patent application Ser. No. 14/147,050 filed on Jan. 3, 2014, which is a continuation of U.S. patent application Ser. No. 13/943,465 filed on Jul. 16, 2013, which claims priority to U.S. Provisional Pat. App. No. 61/671,953 filed on Jul. 16, 2012. The entire content of each of the foregoing applications is hereby incorporated by reference.

TECHNICAL FIELD

The present disclosure generally relates to providing musically contextual audio advertisements.

BACKGROUND

In a typical digital music player, each song may be stored in a digital format for playback. To do this, a song can be digitally sampled to convert an audio wave generated by the song to a sequence of binary numbers that can be stored in a digital format, such as MP3. Such files can be stored in computer memory, such as flash memory, hard disk drive, embedded processor, etc. An audio codec microchip can convert the compressed file into an analog sound signal that is emitted from the player.

During playback, audio files may be read from storage into a memory buffer, and then streamed through an audio codec microchip to produce decoded audio. Typically, audio formats decode at double to more than 20 times real speed using the device's processor, requiring the storage of the output from the audio codec microchip. This output is then fed through a digital-to-analog converter to play music. So that a user can hear the music playing, the players may have a 3.5 mm stereo jack to be used with earbuds or headphones, or played via an external amplifier and speakers. Many digital players also include a display and user selection buttons so that a user can select, play, rewind, etc., a song or set a play list.

In a typical digital music player, the songs played by the player are preloaded into the player or may be streamed from an online source (e.g., PANDORA®). For example, the music may be downloaded to the digital music player from a computer or audio content provider, which normally requires the user to pay for the music. As such, the user may select to play a particular song stored in the digital music player using the user select buttons. This song may play only a single time or may be repeated continuously. Sometimes the user may construct a playlist of several songs downloaded or stored in the device memory. In such instances, the user may select to play the songs successively or randomly from the playlist. However, the playlist may only be constructed from songs downloaded into the device memory. Therefore, if the user grows tired of the songs and playlists stored in the device, the user must download additional songs to the device—which requires time and money.

If the music is streamed from the online source, the user may have no control over the song played by the online source. In some instances, however, the user may select the music genre, such as rock, classical, country, etc., or types of artists that the user likes. In such systems, if the user likes a song, but would like to listen to something else, the online source may also allow the user to skip the song currently playing from the playlist provided by the online source. However, many online sources limit the number of times a user can skip songs on the playlist. Thus, if the playlist from the online source includes several songs the user would like to skip, but cannot, the user may discontinue using the online source.

A need exists, therefore, for a device, system, method, and computer program product that can solve the issues identified above.

SUMMARY

Audio advertisements for music services can be created and played to minimize any perceived discontinuity by a listener from a preceding song. Specifically, a voice-over content item (e.g., a spoken advertisement produced without music) may combined with a non-song musical content item (e.g., backing music specifically produced for advertisements) to create an audio advertisement to be played after a song on a streaming music service. The non-song musical content item may be selected based on its similarity to the preceding song (e.g., genre, tempo, or harmony) and/or a musical preference of a user (e.g., a preferred genre, which can be obtained through a user's music service account and/or can be selected by the user). The genre of both the preceding song and a musical preference of a user may be used to select a non-song musical content item genre by a weighting that determines the probability of the genre used for an advertisement.

In accordance with the disclosed subject matter, a system, method and computer program product for altering the playback of one or more song recordings and/or one or more non-song musical content items is described herein. Embodiments of the system comprise a decision engine having logic for using metadata for the one or more song recordings and one or more non-song musical content items. The logic performs the steps of: responsive to playback of at least a first song recording of the song recordings, interpreting the metadata for the first song recording; identifying a first non-song musical content item for playback at or near an end of the first song recording based on a similarity between the first song recording and the first non-song musical content item; and, in response to determining that the first song recording is at or near its end of playback, forming an altered playback of the first non-song musical content item by performing via real time digital audio signal processing an alteration of the first non-song musical content item to be rhythmically continuous in terms of tempo to the first song recording and/or harmonically continuous in terms of key and/or mode to the first song recording. In some embodiments, the system also includes a playback engine to play back the first song recording and the first non-song musical content item in a continuous fashion.

Another embodiment is a computer-implemented method executed by a decision engine for mixing a first song recording with a first non-song musical content item. In this embodiment, the decision engine performs the steps of: accessing metadata for one or more song recordings including a first song recording, and metadata for one or more non-song musical content items including a first non-song musical content item; responsive to playback of at least the first song recording, interpreting the metadata for the first song recording; identifying the first non-song musical content item for playback at or near an end of the first song recording based on a comparison of the metadata of the first song recording and the metadata of the first non-song musical content item; and in response to determining that the first song recording is at or near its end of playback, forming an altered playback of the first non-song musical content item by creating an alteration of the first non-song musical content item to be rhythmically continuous in terms of tempo to the first song recording and/or harmonically continuous in terms of key or mode to the first song recording.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art may appreciate that the conception upon which this disclosure is based may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These, together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages, and the specific objects attained by its uses, reference should be made to the accompanying drawings and descriptive matter in which there are illustrated preferred embodiments of the disclosed subject matter.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIGS. 4A-4E are software flow diagrams illustrating the mixing of two or more songs according to an embodiment.

DETAILED DESCRIPTION

Figure 1:
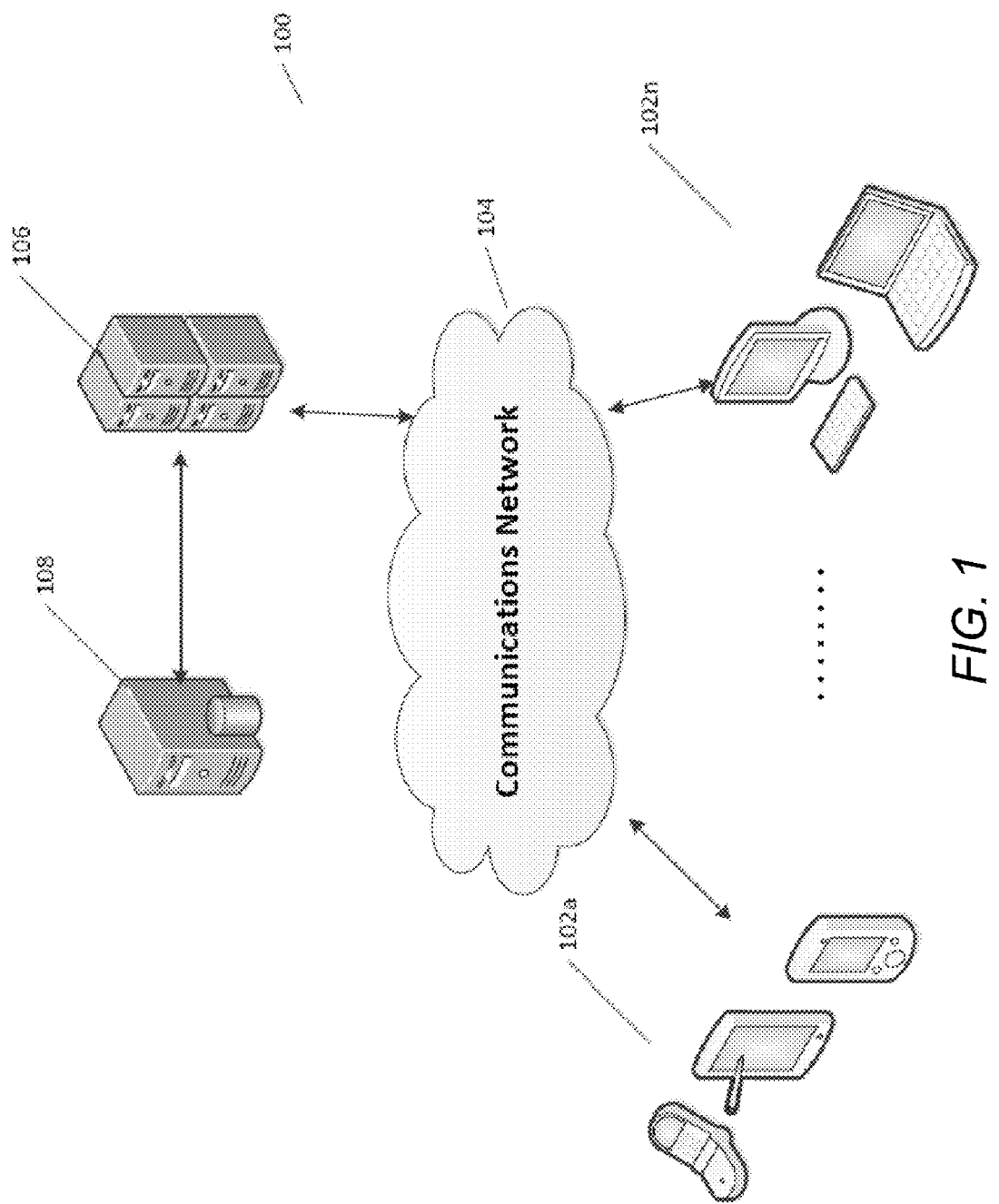
FIG. 1 is a network diagram according to an embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

To address issues discussed above, embodiments may include a system for allowing a user to select to mix songs stored in a digital music player memory or provided by an online service. To do this, the system may map the tempo, beat, swing, and/or harmony to one or more portions of the song, and then assign a metatag associated with the same to each portion. Metatags, in some embodiments, may be used to repeat a portion of the song (such as the harmony), mix at least portions of two songs together (such as the chorus of two songs), or fade one song into a subsequent song on the playlist based upon a song segment. The metatags for the song are assigned by analyzing the song's chords, tempo, harmonic relationships, etc., prior to the song playing on the digital music player. In some embodiments, the music player may mix two or more songs to be played before the digital music player plays the song. In other embodiments, the mixing is performed in real time digital audio signal processing.

As may be understood by those of skill in the art, the term "digital music player" may be a portable device such as an MP3 player or iPod®, a desktop, laptop, personal digital assistant (PDA), cellular telephone such as a Smartphone, computer tablet, networked computer display, computer server, WebTV, as well as any other electronic device capable of storing and replaying digitally stored music or receiving music from an online service. As such, the term "digital music player" is not limited to a portable music player. As will also be understood, "digitally stored music" may be any music that is stored in computer memory. Further, the phrase "mapped" to the song may refer to storing song location information such as beat, time, measure, bar, etc., together with metatags such as information related to the song or processes described herein.

FIG. 1 is a system diagram according to an embodiment of the invention. The system 100 of FIG. 1 includes one or more digital music players 102a-102n connected to a communications network 104, and a music server 106 and associated storage 108.

The communications network 104 is positioned between the digital music players 102 and the music server 106 to provide the users, via digital music players 102, local or remote access to the music server 106 (e.g., so that the user and the digital music players can be located in same physical location or in different physical locations). Each of the application servers implementing the music server 106 may connect to storage 108. The storage 108 stores song data files that the user can access through the communications network 104.

As one skilled in the art will appreciate, digital music player 102 can be any computing device capable of connecting to the communications network 104 and receiving data from the same. As such, digital music player 102 enables the user to interact with the music server 106 to view, store and retrieve data files. As such, digital music player 102 is connected to the music server 106 via communications network 104, which may be a single communications network or comprised of several different communications networks, to connect the system. The communications network 104 can also be a combination of public or private networks, which can include any combination of the Internet and intranet systems that allow a plurality of system users to access the music server 106, and for the digital music player 102 to connect to remote music servers 106. For example, communications network 104 can connect all of the system components using the Internet, a local area network ("LAN") such as Ethernet or Wi-Fi, or wide area network ("WAN") such as LAN to LAN via internet tunneling, or a combination thereof, using electrical cable such as HomePNA or power line communication, optical fiber, or radio waves such as wireless LAN, to transmit data. As one skilled in the art will appreciate, in some embodiments, the digital music player 102 and music server 106 may be connected to the communications network 104 using a wireless LAN, but other users may be connected to the digital music player 102 via a wired connection to the Internet. In other embodiments, a user may connect to the music server 106 using a wireless LAN and the Internet. Moreover, the term "communications network" is not limited to a single communications network system, but may also refer to several separate, individual communications networks used to connect digital music player 102 to music server 106. Accordingly, though each of digital music player 102 and music server 106 is depicted as connected to a single communications network, such as the Internet, an implementation of the communications network 104 using a combination of communications networks is within the scope of the invention.

As one skilled in the art will appreciate, the communications network 104 interfaces with music server 106, preferably via a firewall and web server (both not shown) to provide a secure access point for users (not shown) and to prevent users from accessing the various protected portions of the storage 108 in the system. The firewall may be, for example, a conventional firewall as discussed in the prior art.

Storage 108 communicates with and uploads music data files to the music server 106 and communications network 104. As one skilled in the art will appreciate, though storage 108 is depicted as a database, storage 108 may be implemented in one or more computers, file servers, and/or database servers. As such, the storage 108 may be implemented as network attached storage (NAS), storage area network (SAN), direct access storage (DAS), or any combination thereof, comprising, for example, multiple hard disk drives. Moreover, each of these file servers or database servers may allow a user to download music. For example, a user may have an associated username, password, etc., that allows the user to store or retrieve various music files, or songs, from storage 108. Additionally, attributes of the music, such as tempo, harmony, beat/time map, etc., may be stored in storage 108, and associated with a particular song. These attributes can be stored in one or more computers comprising the storage 108 in a plurality of software databases, tables, or fields in separate portions of the file server memory. Accordingly, as is known in the art, the computer implementing storage 108 may have stored thereon a database management system (e.g., a set of software programs that controls the organization, storage, management, and retrieval of data in the computer). As one skilled in the art will appreciate, in some embodiments, storage 108 may be a software database stored in the music server 106 memory (to be discussed below). As one skilled in the art will also appreciate, though storage 108 is depicted as connected to, or as a part of, the music server 106 (and not the communications network 104), the storage 108 may be, for example, a remote storage connected to the music server 106 via the cloud.

Music server 106 will now be described with reference to FIG. 2. As one skilled in the art will appreciate, music server 106 can be any type of computer such as a virtual computer, application server, or a plurality of computers (e.g., a dedicated computer server, desktop, laptop, personal digital assistant (PDA), cellular telephone such as a Smartphone, computer tablet, WebTV, as well as any other electronic device). As such, music server 106 may comprise a memory 206, a program product 208 (shown as "computer program" in FIG. 2), a processor 204, and an input/output ("I/O")

device 202. I/O device 202 connects the music server 106 to a signal from the communications network 104, and can be any I/O device including, but not limited to, a network card/controller connected by a bus (e.g., PCI bus) to the motherboard, or hardware built into the motherboard to connect the music server 106 to various file servers or database servers implementing storage 108.

Processor 204 is the "brains" of the music server 106, and as such executes program product 208 and works in conjunction with the I/O device 202 to direct data to memory 206 and to send data from memory 206 to the various file servers and communications network. Processor 204 can be, for example, any commercially available processor, or plurality of processors, adapted for use in music server 106 (e.g., Intel® Xeon® multicore processors, Intel® microarchitecture Nehalem, AMD Opteron™ multicore processors, etc.). As one skilled in the art will appreciate, processor 204 may also include components that allow the music server 106 to be connected to a display, keyboard, mouse, trackball, trackpad, and/or any other user input/output device (not shown), that would allow, for example, an administrative user direct access to the processor 204 and memory 206.

Memory 206 may store the algorithms forming the computer instructions of the instant invention and data. Memory 206 may include both non-volatile memory such as hard disks, flash memory, optical disks, and the like, and volatile memory such as SRAM, DRAM, SDRAM, and the like, as required by embodiments of the instant invention. As one skilled in the art will appreciate, though memory 206 is depicted on, for example, the motherboard of the digital music player 102, memory 206 may also be a separate component or device connected to the music server 106. For example, memory 206 may be flash memory, an external hard drive, or other storage.

Figure 2:
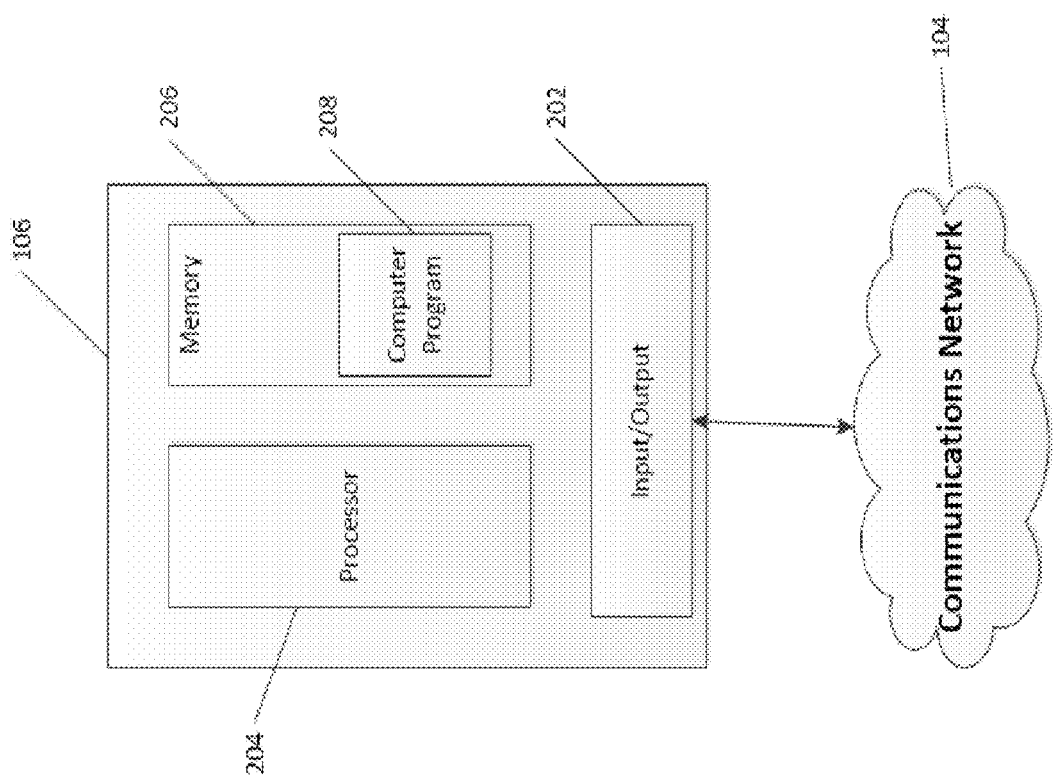
FIG. 2 is an electronic block diagram of a digital music player according to an embodiment.
Figure 3:
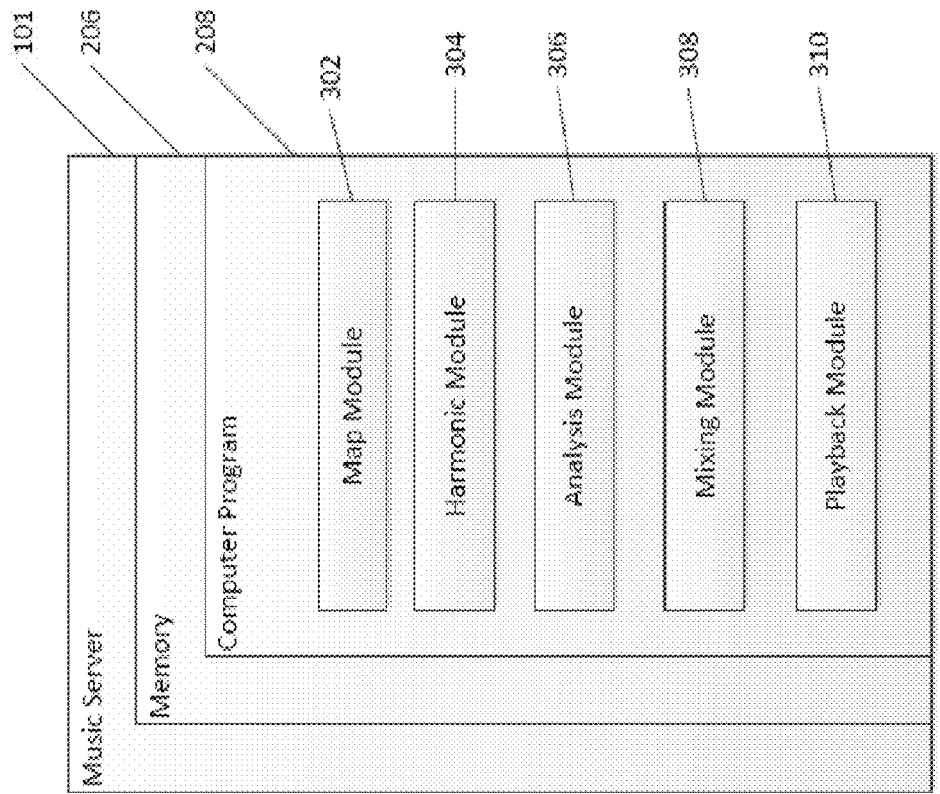
FIG. 3 is a software block diagram for software stored on a digital music player according to an embodiment.

As shown in FIG. 2, an embodiment for computer instructions forming computer programming product 208 implementing some of the functionality of the music server 106 is stored in memory 206 (e.g., as a plurality of programming modules). As one skilled in the art will appreciate, though the program product 208 is depicted as being stored on the music server 106, the program product 208 may also be stored in the memory of the digital music player 102, for example, to manage and play songs stored in the memory of the digital music player 102. Turning now to FIG. 3, the programming modules of the computer program product 208 stored in memory 206 may include a temporal map module 302, a harmonic map module 304, analysis module 306, mixing module 308, and playback module 310. The temporal map module 302 tags, or stores in memory, the beats, bars, tempo, swing, as well as the location of significant section start points (drop points) of the various songs. For example, the various songs may have metatags for each song beat, each song bar, the tempo or tempo changes associated with each bar, and the swing between notes. Music Information retrieval (MIR) processes may include bar/beat grid detection routines. As one skilled in the art will appreciate, the metatags for the temporal locations in some embodiments are part of the preprocessing steps associated with the invention. In some embodiments, the temporal map module 302 can include instructions that enable the music server 106 to determine a map for the beat/bar, tempo, and swing of a song that may be stored in, for example, the database 108. The beat/bar map stores the beat and bar of the song with respect to time. For example, the particular beat and the time of the beat and the number of beats in a bar may be stored in computer memory so that other characteristics of the music can be mapped to the beat/bar of the song. In some embodiments, for example, if the song changes time, the beat/bar map will indicate the change. For example, if the song changes from 2/4 time to 4/4 time, the beat/bar map will indicate the time that the initial beat/bar is two quarter notes per bar (2/4), and where the beat/time changes, that the beat/time is four quarter notes per bar (4/4). The tempo map notes the relative speed of the song, and may also vary. For this reason, an initial tempo at time zero may be stored, and when the tempo changes, the new tempo may be stored together with the beat/bar of the tempo change. The swing of the song is the space between an off-beat and a successive beat in a song (e.g., in the sound of a heartbeat, da, duh-da, duh-da). The swing of a song may also be mapped with respect to the beat of the song (e.g., to indicate the off-beat and successive beat within the bar).

Figure 7:
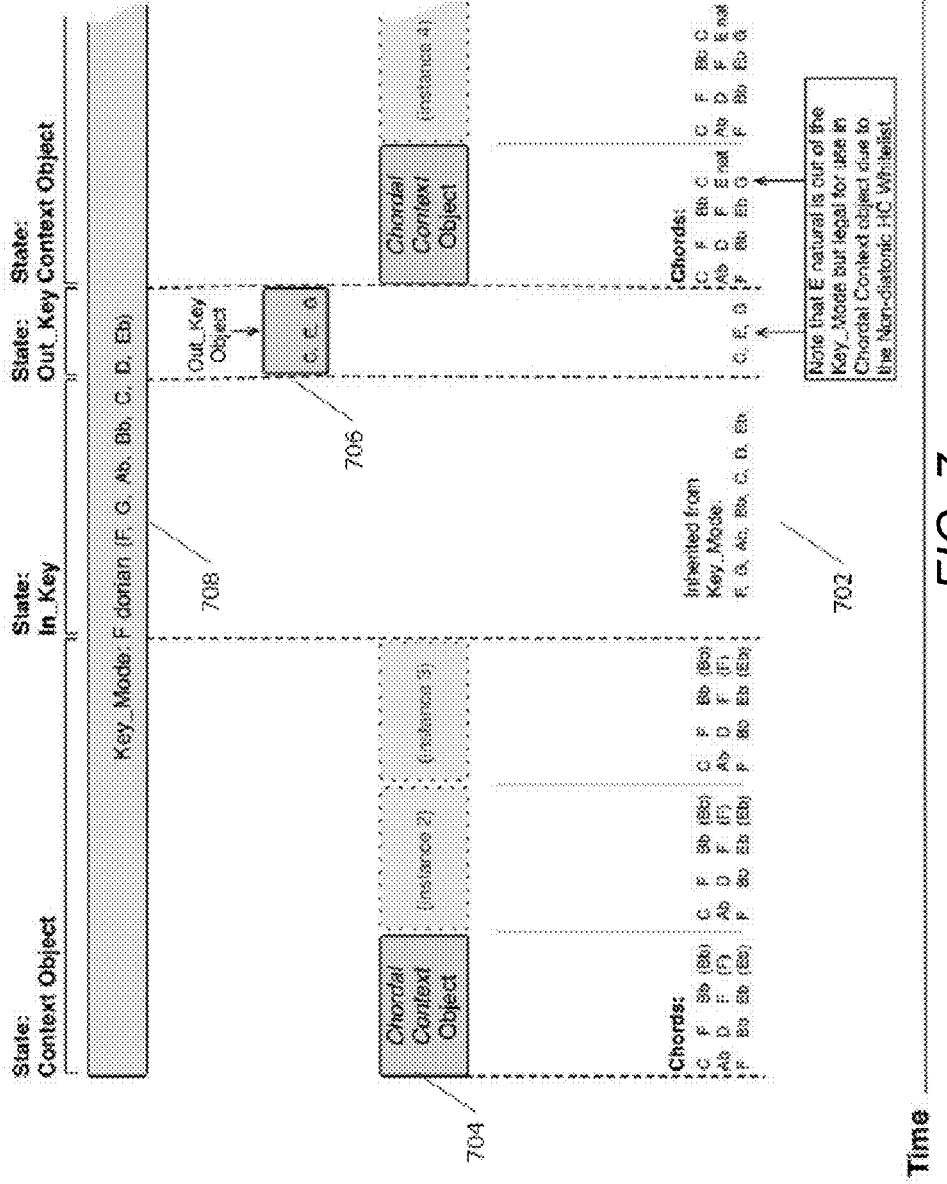
FIG. 7 is a diagram indicating the various objects of a song, including chordal context objects, in_key object, out_key objects, and key_modes according to an embodiment.

The harmonic module 304, similar to the temporal map module 302, metatags the various chords and chord series forming context objects. Data is obtained via music information retrieval (MIR) processes that may include chordal harmony and lead melody presence/note detection routines. Individual metadata points (i.e., bar/beat locations, chords, etc.) may be analyzed to ensure harmonic metadata is accurate (i.e., chord and lead melody onset location is quantized to Bar/Beat location, lead melody notes are filtered by underlying chords, etc.). In some embodiments, the harmonic module 304 metatags chord patterns as context objects, and some melodic chord patterns as loop objects. Each of the context objects and loop objects may be delineated with a drop point, and may comprise stem content. As one skilled in the art will appreciate, stem content is the various portions of a song that combine to make the complete musical composition. The harmonic module 304, in some embodiments, may include instructions that map the various harmonies in the song with respect to the beat/bar map. The harmonic module 304 may determine whether the song is in stem mode, list harmonic objects, map harmonic state anchors, map lead status, map key mode, determine genre, and generate a phrase play segment list. For example, if the harmonic module 304 determines that the song is in stem mode, various stems, or sub-mixes of the master recording making up the full mix, are indicated and stored in separate memory locations. In some embodiments, the harmonic module 304 may also indicate the nature of the lead stem, or main harmony, which may be a single (monophonic) lead melody track, synthesizer content, or a polyphonic mixture of vocals (lead and background vocals) or synthesizers. The harmonic module 304 may also list harmonic objects, which may include context objects 704, out_key objects 706, key mode objects 708, and in-key objects 702 as shown in FIG. 7. Here, in-key objects 702 are merely flags to inform the playback system to allow the underlying key mode to "poke through" in the absence of a context object 704. Context objects 704 are repeatable cohesive musical atomic cells with a harmonic component and a temporal phrase component that may be defined by the system. In other words, the context objects 704 define a plurality of chords that the song plays over a plurality of musical bars (e.g., 1, 2, 4, or 8 full bars). It is not necessary that context objects 704 have entire audio patterns that loop, however. In some embodiments, the context objects 704 may be compared with another song, context object, etc., to create a unique song composition. In such embodiments, a beginning and ending down-beat location form harmonic state anchors for the context object 704, to which the system can segue a playing song into other music, repeat other context objects 704, replay the context object 704, etc.

Context objects 704 may be chordal context objects or, in the case of song content provided with a lead voice stem, mono context objects (e.g., the context object contains a single monophonic voice).

Figure 8:
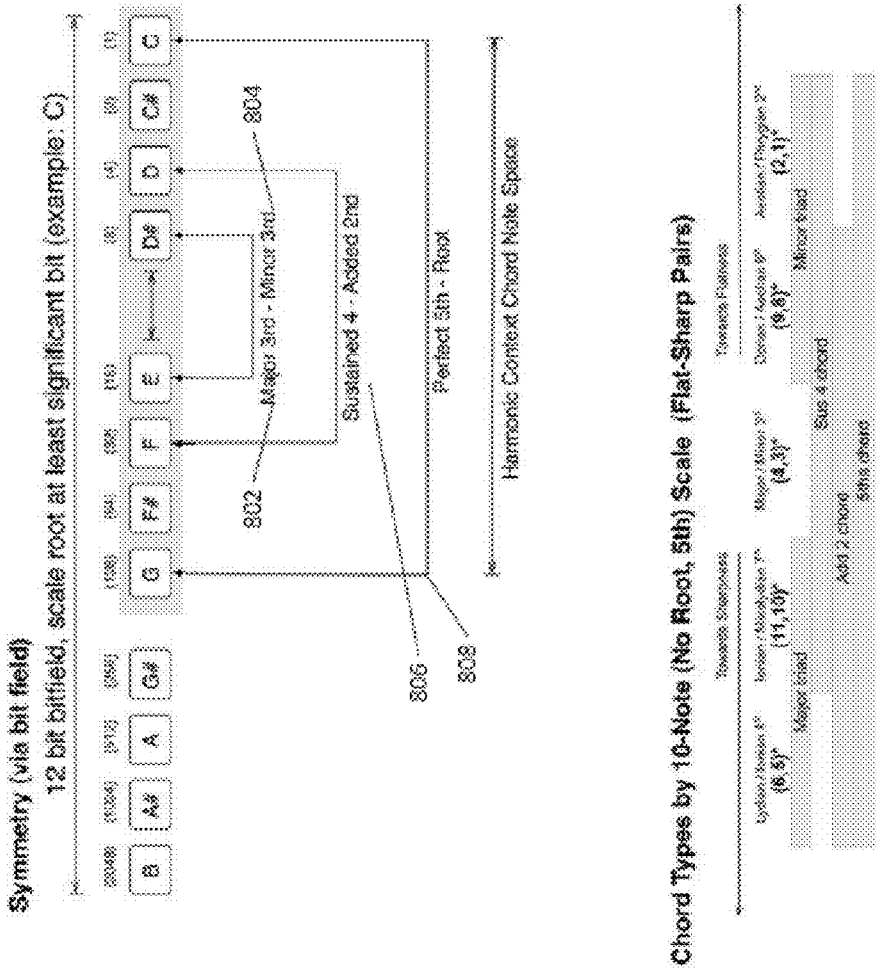
FIG. 8 is a diagram indicating how various chords are stored in memory according to a 12-bit binary number according to an embodiment.

Chords in such context objects may be limited to three notes—e.g., major triad (C, E, G) 802, minor triad (C, Eb, G) 804, add2 (C, D, G) 806, add 11th (C, F, G), or as one skilled in the art will appreciate, a two-note open 5th (C, G) 808 to represent distorted guitar "power chord" harmony as shown in FIG. 8. Here, the reciprocal/symmetrical design of the chord schema is apparent in the chords stored as bit fields. For example, if the 12 bits are divided into three groups of 4 bits, a perfect 5th 808 (the most mathematically consonant non-octave musical interval) will span the two least significant 4-bit sets of the bit field. The 2 adjacent bits at the midway point of these two 4-bit sets represent the minor and the major third of a triad (arguably the most fundamental subjective chordal distinction humans make), and the 2 bits representing the next level of the system's chordal harmony (the 'add 2' and 'sus 4' sustained non-3rd tones) 806 are equidistant on either side. Also note that if the 10 tones of the diatonic scale (other than the tonic and perfect 5th) are arrayed in sharp-flat pairs along the Pythagorean circle of 5ths with the 3rd in the center (4th, 7th, 3rd, 6th, 2nd), the reciprocal modal structure of the chord schema is also apparent.

In addition to defining the context objects, the system may also define out_key objects (e.g., the context object includes chords not defined by the key mode object discussed below) and in_key objects (e.g., the state of the song if there is no context object or out_key object defined during metatagging) as discussed with reference to FIG. 7 above. The key mode object defines the nature of the song key using the full 12 note diatonic modes (scales). In some embodiments, however, where the song leaves a tone from the full 12-note diatonic mode ambiguous, the system may also support two 6-note scales (e.g., minor key, no 6th; major key, no 7th). In this way, the system optimizes the representation of the key by not under-defining a song that makes full use of a 12-note diatonic scale by a simple "key" (i.e., A minor), nor over-defining a song that leaves a tone from the full 12-note diatonic mode ambiguous. As one skilled in the art will appreciate, even though the key of a song may change, the key mode objects are, in general, static, and therefore act as a "fallback" metatag for song compatibility in instances where the context object is not defined. In other words, the key is the simplest harmonic definition, and is a less-reliable indicator of musical compatibility than a context object comparison, but may still be used by the system if needed. The key mode objects are mapped to the beat/bar locations. As one skilled in the art will appreciate, for many songs the key will not change, so there will only be one key mode mapped to the song. In some embodiments, key changes may be supported, so the beat bar location will be mapped with key mode objects in such embodiments The harmonic state anchor map is a data structure that represents the harmonic objects together with the beat/bar map. As such, in some embodiments, the harmonic state anchor map includes both drop points (e.g., points that indicate the start (or end) of a major section of the song defined by the context objects or an in-key state) and Loop HC objects (e.g., a set of contiguous context objects whose audio is such that the set can be acceptably repeated without clicks or glitches). The lead status map is a data structure that represents the map of the beat bar location together with the lead stem type (e.g., "none," "vocal," "instrumental"). The genre metadata indicates the type of song that is playing (e.g., classical, modern, pop, electronica, etc.). In some embodiments, the system may use a third-party genre recommendation service to narrow the potential songs to form the composition—in which case a separate genre indicator may be redundant.

Finally, for songs delivered to the system with lead melodic (usually vocal) stem content, the harmonic module 304 may create a phrase play segment list. The phrase play segments are portions of the lead melodic stem that may include antecedent/consequent segments spanning half of the context object. For example, some songs have a beginning portion that is antecedent and an ending portion that is consequent, so that the context object may be further segmented into two parts, and these two parts may be defined by drop points allowing segues or loops of other candidate songs. In some embodiments, an additional level of segmentation of the context object is supported (e.g., each antecedent/consequent segment defines a quarter of the context object so that there are four subparts of the context object). However, in such embodiments, the system may only support one level of segmentation or one level of drop points allowing for segues or loops.

In some embodiments, the analysis module 306 may include instructions that enable the system to analyze songs within a song catalogue to determine songs that are compatible for combining using the methods described herein. For example, the analysis module 306 may include instructions that determine the compatibility of the tempo or harmonic capability of two or more songs. In some embodiments, the analysis module 306 determines, or outputs, three different song pair segue scenario types for each song pair analyzed: tempo discrete segue scenario song pairs (songs do not match in tempo or harmonic shape of context object musical phrase), tempo concurrent segue scenario song pairs (songs match in tempo but not in harmonic shape of context object musical phrase), and context concurrent segue scenario song pairs (songs match in harmonic shape of context object musical phrase). In this context, the harmonic phrase is represented over a number of bars (such as 1, 2, 4 or 8), and the harmonic shape represents the chord changes within this phrase.

To analyze the tempo, the analysis module 306 may, for example, determine a tempo differential using the ratio of the average tempo of the beginning bars of one song to the average tempo of the ending bars of a second song (or "candidate song"). Such a method may be used to account for any gradual tempo changes in either song. The golden ratio may be used to determine the number of beginning bars of the first song and ending bars of the second song for which to average the tempo (e.g., 0.381966 bars of the total for each song). In some embodiments, once two songs are compared, the analysis module 306 determines whether a potential song pair is tempo discrete (e.g., tempos do not match) or tempo concurrent (e.g., the tempos match). As such, the failed song pairs may be stored in a list of song pairs whose tempos are too different for use in tempo-matched segues with attributes of the candidate song (e.g., a Pair_Stem flag, start tempo of the candidate song, start swing of the candidate song, and start Key_Mode of the candidate song). In this regard, the Pair_Stem flag may indicate whether the song includes stem content, and if so, the type of stem content. Note that since these song pairs have not had "poly" HCM sets created as a result of harmonic evaluation process (see below), the possible combinations are as follows: 'None'—'None'; 'None'—'Mono'; 'Mono'—'None'; 'Mono'—'Mono'; and 'Mono'—'Poly', where 'None' indicates no stem content and 'Mono' represents monophonic content such as a single lead vocalist or instrument. The start tempo for the candidate song represents the averaged tempo at the start of the candidate song; the start swing of the candidate song represents the swing amount during the context object defining the start of the candidate song or In_Key state, and the start Key_Mode represents the Key_Mode at the start of the candidate song.

In some embodiments, the tempo analysis and harmonic analysis are run concurrently, or the segue scenario type is not determined until the temporal and harmonic evaluation of the song pair is complete. In such embodiments, if the song passes the tempo evaluation, but fails the harmonic candidate evaluation (discussed below), the system may construct a tempo-concurrent look-up table storing attributes of the candidate song (e.g., the Pair_Stem flag discussed above and first drops of the candidate song). Such a tempo-concurrent look-up table may enable the user to determine songs that have compatibility for segues, but may be incompatible for mixing or looping without shifting the key of the candidate song (or stems in the candidate song). As one skilled in the art will appreciate, a table of candidate songs may be constructed for each song so that when the song is playing with the data above (e.g., pair_swing flag, start swing, stem content, etc.), the system can determine the proper candidate for the chosen task (e.g., segue, looping, mixing, etc.).

Figure 9:
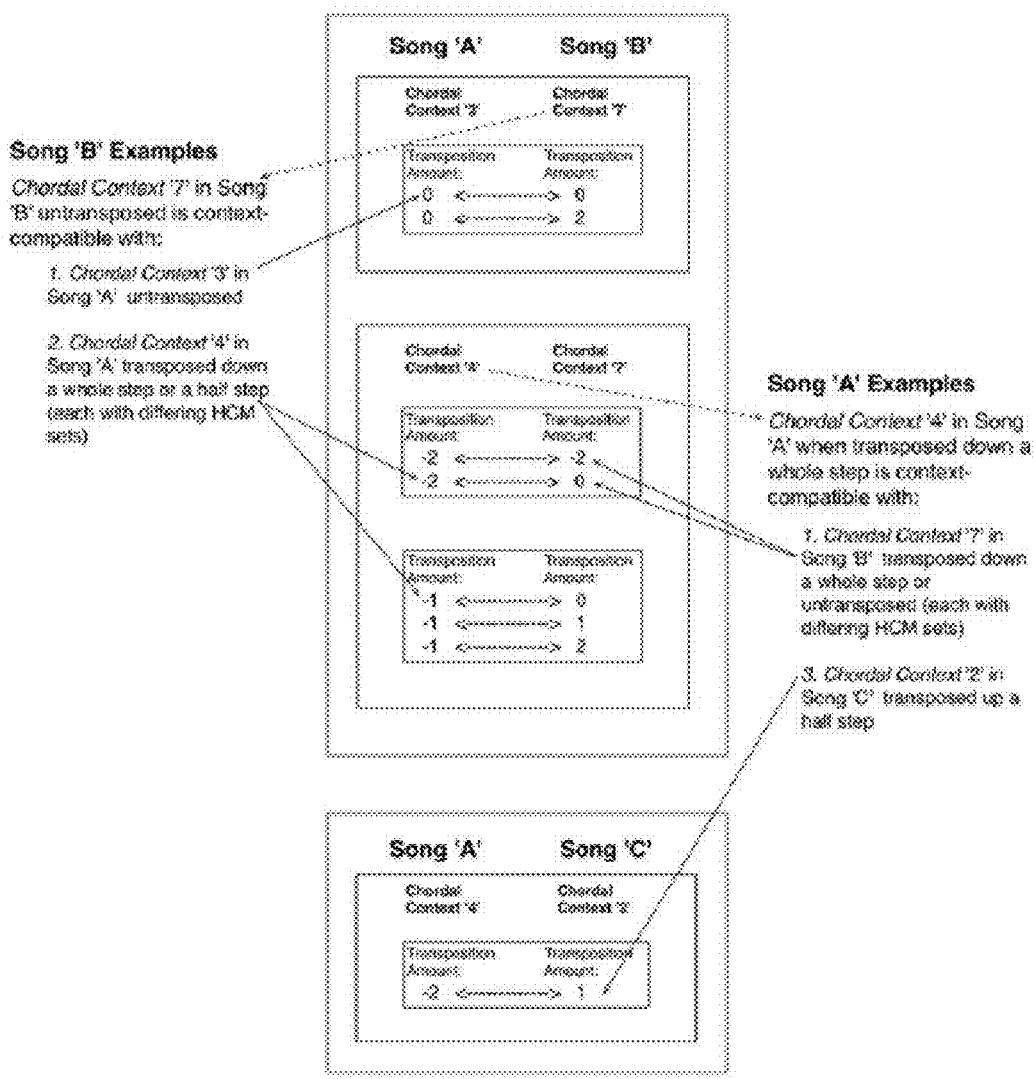
FIG. 9 is a diagram indicating the reciprocity between chordal context objects in two songs and any relative transposition amounts for such chords for compatibility according to an embodiment.

Prior to playback, to evaluate the harmonic compatibility of a song to a plurality of candidate songs, the system determines, by the beat and bar number, the harmonic compatibility of the various chords of a context object of a current song with a context object of a candidate song (which may be referred to as song A and song B during the evaluation process). Within each context object-level iteration, the system iterates across the individual chord elements of the song A and song B context objects. Within a context object, chord durations are variable but must be in units of a ¼ note with a ¼ note minimum chord duration. To perform a full chord <=> chord check of two context objects, the system iterates in increments of the smallest chord duration found between either of the two context objects. Context object lengths are also variable, but since they must consist of full bars and the number of bars must be a power of two (1, 2, 4, 8, 16), a modulus operator is used on the indexing to insure that the shorter context object (if there is one) repeats against the longer. For example, the system may determine a harmonic comparison metric set ("HCM set"), that may include a common count metric, a ½ step count metric, a 5th distance metric, a chord A miss, and a chord B miss, to define the harmonic compatibility of a context object in the candidate song. In some embodiments, this evaluation is performed by comparing the chords using the smallest chord duration greater than a quarter note between the current song and the candidate song. In this regard, the common count metric may be the count between common tones in the current song and candidate song chords. Here, the larger the common count, the better the match between the current song and the candidate song. The ½ step count metric may be the half step tone relationship between triads of the current song and the candidate song. Here, the fewer half steps between the tones of the current song and the candidate song, the better the match between the song pair. The 5ths distance metric represents the distance in nodes along the circle of 5ths between the current song and the candidate song, with positive numbers being sharp and negative numbers being flat. As one skilled in the art will appreciate, the 5ths distance is not reciprocal, meaning the distance between nodes of the current song and the candidate song is not the same distance as that between the candidate song and the current song. When using the value, the runtime system understands the non-reciprocity of the relationship. The chord A miss metric may be the number of chords in the current song that do not match the chords in the candidate song. Similarly, the chord B miss metric is the number of chords in the candidate song that do not match the number of chords in the current song. In this way, the HCM result set is reciprocal during playback lookups. Such context-current reciprocity is shown in FIG. 9. Because harmonic evaluation occurs prior to playback, the evaluation phase must cover all hypothetically possible "current" song pitch shift amounts (transpositions) to account for any situations. The number of the possible amounts are usually limited to 1-2 single steps up or down—any more would be audible to the listener. For example, consider two songs, Song A and B. At playback, Song A ends and Song B has been selected by the system to be pitch-shifted (transposed) up a single tone to make a successful (consonant) segue from A to B. Three minutes later Song B is ending and it has been playing up a single step, resulting in all of its chords being up a single step. The system needs quick (for scalability) access to a list of candidate songs at specific pitch shift amounts (transpositions) that would make another successful (consonant) segue from these (one step up) Song B chords (note that for example Song B could have just as easily been pitch-shifted/transposed down two steps or not transposed at all).

[As one skilled in the art will appreciate, events occurring on the downbeat of a measure are of more importance in terms of musical perception. Therefore, HCM values occurring on the downbeats are scaled such as to accentuate both "positive" and "negative" metrics:

Common Count is the only "positive" metric, so this is multiplied by a certain amount greater than one (e.g., the golden ratio may be set to the initial default which is 1.618034)

The other HCM set members are all "negative" (or in the case of 5ths Distance, ambiguous). Therefore, these metrics are multiplied by a certain amounts greater than one if they are not on the downbeat (e.g., the golden ratio may be set to the initial default)

Figure 11:
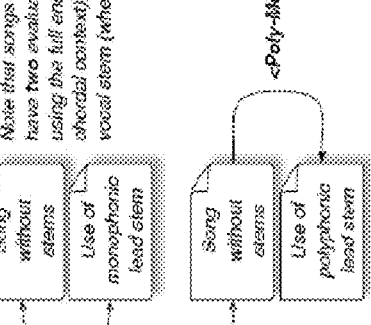
FIG. 11 is a block diagram of song pre-processing according to one embodiment.

Moreover, in instances where songs are provided to the system with polyphonic "Lead" stem content (i.e., the songs have a homogenous voice), the compatibility of such "Lead" stem content may be determined. For example, if the Pair_Stem element for either Song A or Song B context object currently equals "None" (signifying a chordal context was used for this iteration), the parent song's stem mode metadata value is checked. If the stem mode metadata indicates stem content that is "Poly", the chordal context-derived HCM set and its Pair_Stem flag are copied and bound together to create the basis for an additional harmonic candidate evaluation result for this iteration representing the relationship based on the segue pivot use of polyphonic "Lead" stem content. Then, more "tolerant" poly metrics scaling may be applied to the copied HCM set, and the appropriate element(s) of the copied Pair_Stem flag is changed to "Poly." Note that because of the additional polyphonic "Lead" stem evaluation results, the Pair_Stem flag now accurately represents the song metadata stem mode value. As such, there may be nine possible Pair_Stem values (rather than five, as was the case during the harmonic evaluation iteration discussed above): 'None'—'None', 'None'—'Mono', 'None'—'Poly', 'Poly'—'None', 'Poly'—'Mono', 'Poly'—'Poly', 'Mono'—'None', 'Mono'—'Mono', 'Mono'—'Poly'. FIG. 11 shows song pre-processing as described above.

In some embodiments, the analysis module may store various candidate specific data sets for the song pair, or harmonic candidate evaluation results sets, during the harmonic evaluation. For example, for a Song A and a Song B, the analysis module 306 may determine a candidate specific harmonic candidate evaluation result set. In some embodiments, each set will include the first drops or drop points for the unique context objects, the averaged tempo at the first drops (drop tempo), the swing at the drop point (drop swing), an indicator as to whether there is a loop at the drop point (LCH status flag), the aggregate length of the context object defined by the drop point or a contiguous set of context objects defined by the drop point, the lead type of any stem content at the drop point, and the phrase play status (e.g., whether there are phrase play segments at the drop point).

Figure 5A:
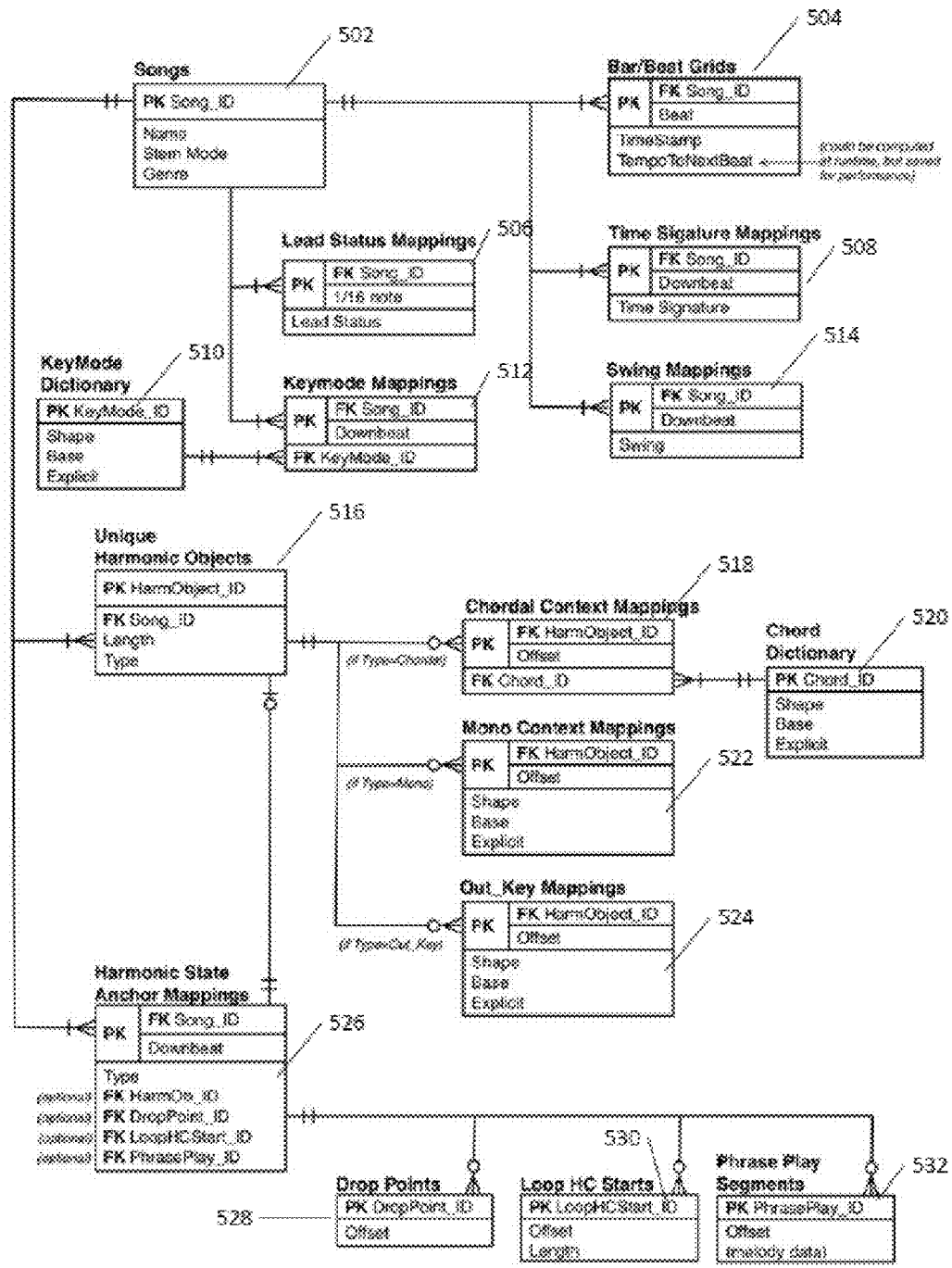
FIGS. 5A-5B are database diagrams storing look-up tables according to an embodiment.

As one skilled in the art will appreciate, the results of the temporal candidate evaluation and harmonic evaluation may be stored in various database tables (discussed in detail below). As such, each of the tempo discrete scenario song pairs may have tables that link a current song to a table of tempo discrete candidate songs and information related to those candidate songs, such as the song ID, Pair_Stem flag, average start tempo, start swing and start key mode. In some embodiments, the tempo concurrent segue scenario song pairs may have tables that link a current song to a table of tempo concurrent songs and information related to those songs including the drop point location for context objects, the average drop point tempo, the drop swing, the drop key mode, a flag indicating whether there is loop content, and the aggregate length of contiguous context objects. Similarly, in some embodiments the context concurrent segue scenario song pairs may have tables that link a current song to a table of context concurrent candidate songs and information related to those candidate songs, such as the Pair_Stem flag, HCM set ID (that may link to a table that may include values for the HCM set), and a candidate specific ID (that may link to a table that may include variables for the drop point location, average drop point tempo, drop swing, drop key mode, LHC flag, and aggregate song length for both the current song and the candidate song, etc.). Such tables are discussed in more detail below in FIGS. 5A and 5B.

As previously mentioned, once the temporal candidate evaluation and harmonic candidate evaluation are complete, the system can create tables for tempo discrete, tempo-concurrent, and context-concurrent songs. The mixing module 308 may use these tables to generate look-up tables specific to a current song to its tempo-discrete, tempo concurrent and context concurrent song pairs at runtime. In other words, the analysis module 306 may pre-process songs as they enter the song catalogue, but the mixing module generates optimized tables for runtime song selection. In some embodiments, the mixing module 308 may also include instructions enabling runtime segue and song pair selection and audio operations (e.g., filter parameters, pitch-shifting parameters, etc.).

As previously mentioned, runtime segue selection performs the steps of evaluating a song pair based upon whether the song pair is tempo-discrete (e.g., failed the temporal evaluation), tempo-concurrent (e.g., passed the temporal evaluation but failed the harmonic evaluation), or is context-concurrent (e.g., passed temporal and harmonic evaluations), and storing such songs in associated tables. To do this, the system may use the tables created by the analysis module 306 to determine a ranking of candidate songs, and create an associated look-up table based upon candidate song rank and segue type. For example, a tempo-discrete segue selection type look-up table may contain songs that are not temporally or harmonically compatible, but songs that meet some other criteria for ranking. In such embodiments, even though tempo-discrete candidate songs may not play back at various drop points within the current song, to determine the most appropriate candidate song, the candidate songs may be ranked in the table according to the average tempo difference, the swing difference, the key mode base difference, and the key modal relationship (defined above in the evaluation process) between the current song and various candidates. As such, the look-up table created may include all potential candidates, or a limited number of best matches (e.g., ten candidate songs that have the best compatibility of tempo, swing, key, genre, etc.). As one skilled in the art will appreciate, regardless of rank, songs on a run-time look-up table for tempo-discrete candidates may only play back at the end of the current song. Therefore, start times and/or end times for various songs on the tempo-discrete candidate look-up table may serve as the look-up key. As one skilled in the art will also appreciate, because tempo-discrete segues typically play the current song to its absolute end and the candidate song at its absolute start, the runtime tempo-discrete candidate look-up table may not include values for last drops, first drops list, or current/candidate song length parameters.

For the tempo-concurrent segue scenario type, the runtime tempo-concurrent look-up table may include values for current song last drop/candidate song first drop location pairs eligible for a tempo-concurrent segue selection. The look-up key for such a table, therefore, may be based upon the tempo concurrency at multiple song locations, or drop points, of the current song. As one skilled in the art will appreciate, any such table look-up returns only the candidate songs that have passed the temporal evaluation at particular drop points within the current song. Moreover, in some embodiments, temporal evaluation results for multiple drop locations of both the current song and candidate song may be stored. As such, the table may also include parameters indicating the quality of the song pair's temporal match or ranking of the match at various drop points, which may be calculated using such parameters as the average tempo difference, swing difference, key mode base difference, and key mode modal relationship between the current song and the candidate song as determined in the temporal evaluation as described above. However, in some embodiments, the average tempo difference, swing difference, key mode base difference, and key mode modal relationship between the current song and the candidate song may be separate parameters stored in the look-up table for the tempo-concurrent segue type.

Finally, the system may also create and store a runtime context-concurrent segue scenario table (i.e., the candidate songs that pass the temporal and harmonic evaluations). The look-up key for the runtime context-concurrent segue scenario table may have three parts: the unique context object at the current song last drop location; the active transposition amount (if any) at the current song last drop location; and a Pair_Stem value of the current song. The look-up results may be a set of all possible context objects for all candidate songs, each having a complete harmonic evaluation set, and the quality of the potential candidate song for the context-concurrent segue table may be calculated from the average tempo difference, the swing difference, and the harmonic comparison metrics (HCM) set determined in the harmonic evaluation above.

Moreover, in some embodiments, the mixing module 308 may allow for various system, system administrator, or user-selected modifications during song play back. For example, the system, system administrator, or user may be offered all or (in the case of a user) a subset of segue selection dashboard controls that enable the user to select the type of segue (e.g., tempo-discrete, tempo-concurrent, or context-concurrent, loop type, etc.), the various song pairs based upon song pair attributes, the drop points to begin playback of candidate songs, filtering parameters for ranking song pairs at various drop points, etc.). As one skilled in the art will appreciate, runtime tempo discrete, tempo-concurrent, and context-concurrent segue-type tables may be created or the mixing module 308 may create a list (or table) of candidate songs that meet a particular criteria selected at the segue dashboard, then rank the list for the best match. In some embodiments, the criteria chosen by the system, system administrator or user at the segue selection dashboard may be used by the playback module 310 to determine the candidate song for playback as discussed below.

Returning to FIG. 3, the playback module 310 may be the last of the programming modules in the system. Like the mixing module 308, the playback module 310 may be implemented at runtime, and is responsible for the playback of the segue scenario or other scenario chosen above. As such, the runtime tempo discrete, tempo concurrent, and context concurrent tables and segue instructions may be sent to the playback module 310 for selection of the next song to play back. In some embodiments, the playback module 310 uses a decision tree (a Bayesian network could also be used) to determine the candidate song that will become the next song to play back. For example, if the user selects a particular harmonic quality metric that song pairs should exceed for the song pair to be selected at the segue dashboard, the playback module 310 may determine the candidate song based upon this metric. In other words, the mixing module 308 creates runtime tables or lists for potential song pairs and song pair quality, and determines if there are any user- or system-selected match criteria from the dashboard, and the playback module 310 retrieves the songs that match such criteria from the tables created by the mixing module 308. Accordingly, the following data may be delivered to the playback module 310 so that this selection may be made: current song/candidate song segue start locations, current song/candidate song transposition amounts, Pair_Stem flags, segue attribute weightings, and current song/candidate song length values.

In some embodiments, the playback module 310 may also include instructions that provide to a user a graphical user interface ("GUI") that displays various information to the user such as an indication of the song playing, the current song/candidate song pair, a user selection tab to indicate whether to exclude one or more of the songs or the song pair from the user's future playlist, the time of the song selection, etc. Moreover, in some embodiments, the playback module 310 may include a segue generator that retrieves the data and generates segues between songs for play back.

Figure 4A:
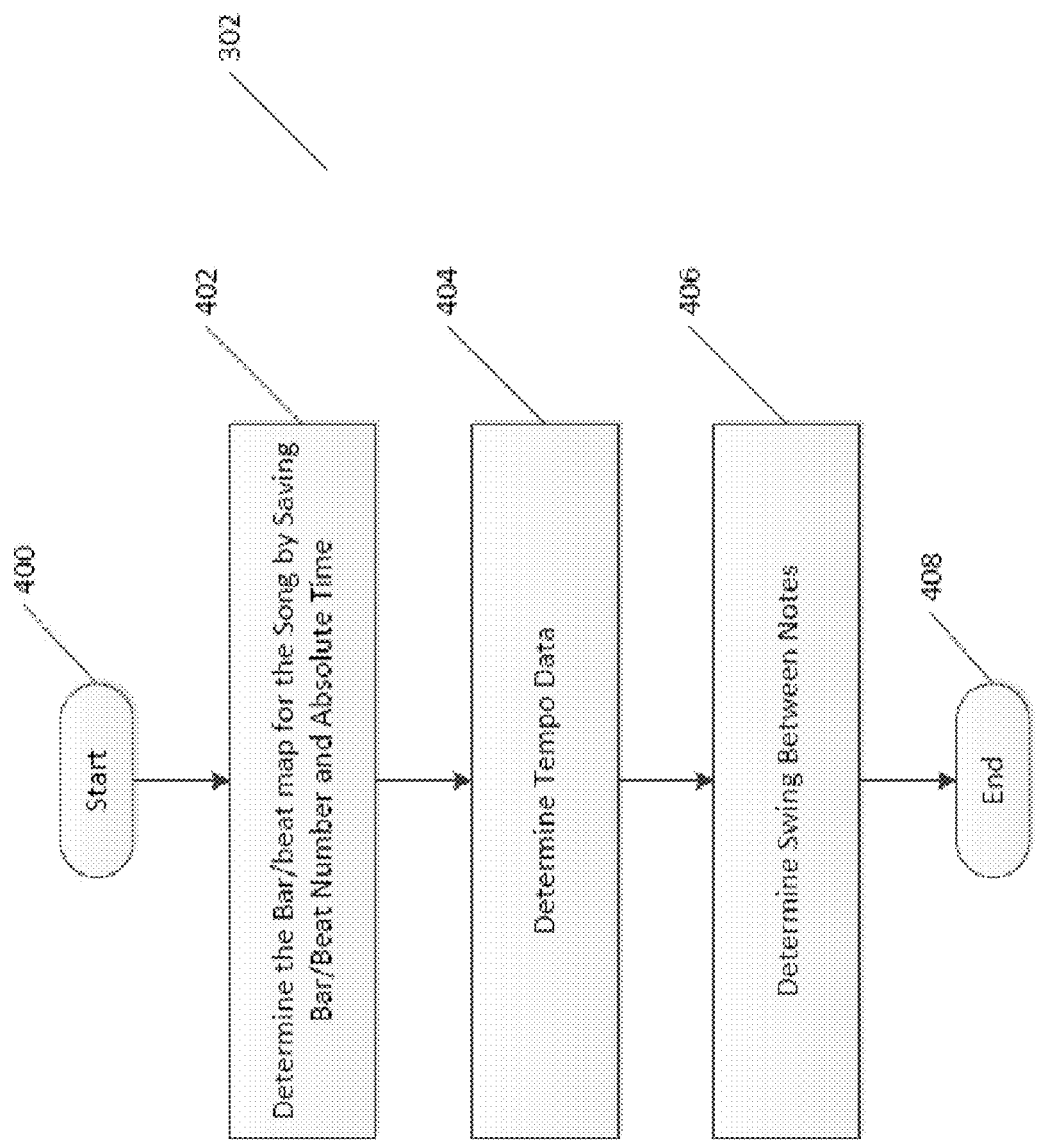

Turning to FIGS. 4A-4E, the process steps implementing the functions of the modules above are described. In FIG. 4A, the temporal map module 302, which provides temporal metatags for the various songs in the system song catalogue, starts at step 400. In step 402, the module determines the beat/bar map for various songs in the song catalogue. As one skilled in the art will appreciate, the beat/bar map may be a list of the beats and the various musical bars for each song with respect to the playback time of the song stored in memory. As one skilled in the art will appreciate, in some embodiments, only the beat or the bar may be stored in memory. In step 404, the module determines the tempo of the song in the song catalogue, and in step 406, the module determines the swing between notes of the various songs in the song catalogue. As one skilled in the art may appreciate, the various songs in the song catalogue may be evaluated before any of the songs are played. In such embodiments, the map module is a preprocessing step that provides temporal metatags to the various songs in the catalogue. In step 408, the process ends.

Figure 4B:
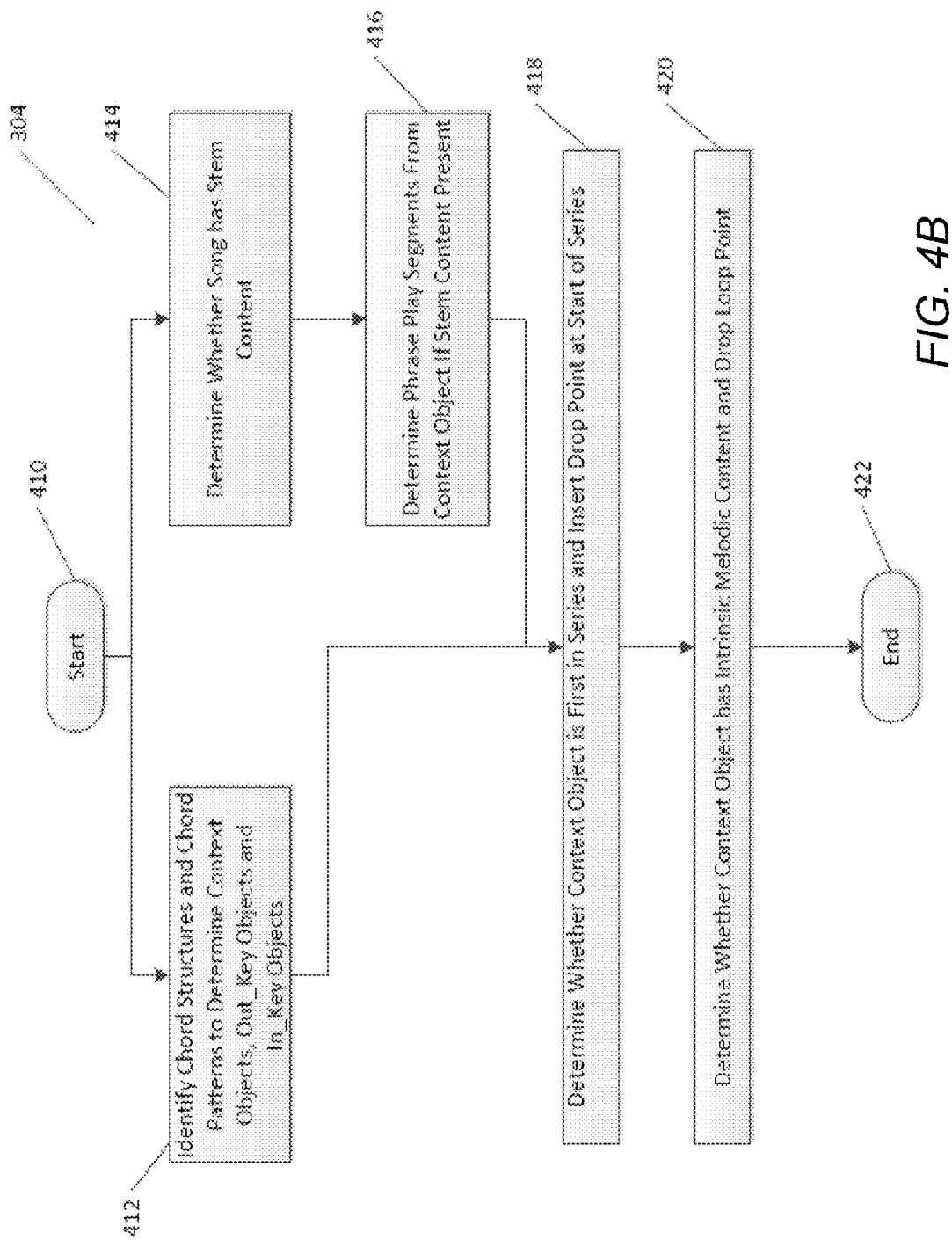

Turning to FIG. 4B, steps performed by the harmonic module 304 are described. The harmonic module 304 provides harmonic metatags for the various songs in the song catalogue. The harmonic module 304 starts at step 410, and at step 412, the module identifies chord structures and chord patterns of each song in the system song catalogue to determine context objects, out_key objects, and in_key objects for each song_key. In step 414, which may be implemented concurrently with step 412, the harmonic module 304 determines whether the song being evaluated has stem content, and in step 416 determines phrase play segments from the context object if stem content is present. In step 418, the harmonic module 304 determines whether a context object is the first object in a series, and if so, inserts a drop point at the start of the series. In step 420, the harmonic module 304 determines whether each context object for a song has intrinsic melodic content, and if so, inserts a drop loop point. For example, the drop loop points may indicate a context object that may be replayed. In step 422, the process ends.

Figure 4C:
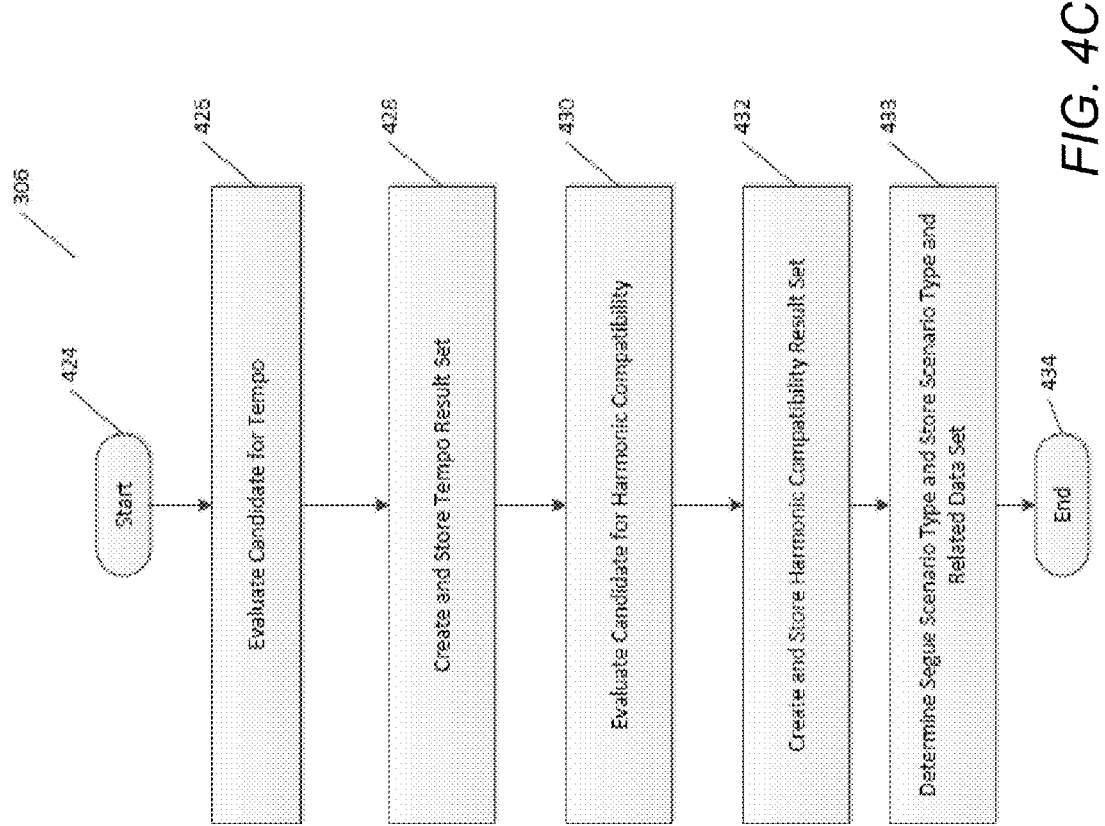

Turning to FIG. 4C, steps performed by the analysis module 306 are described. Here, the process starts at 424, and in step 426, each song is evaluated for tempo compatibility with each other song. As one skilled in the art will appreciate, each song may be evaluated when it is added to the song catalogue (e.g., when the song is licensed or purchased by the service or user). In step 428, the tempo result set is stored based upon the results of the evaluation for tempo compatibility. For example, the system may store a set of data related to songs that are not compatible as well as a set of songs that are compatible for tempo, but not harmony. In step 430, each song is evaluated for compatibility with each other song. As described above, the harmonic evaluation may determine whether two songs have compatible or the same chords, over a particular number of bars. In some embodiments, the harmonic compatibility, and specific harmonic candidate evaluation results are stored by the system as described above. In step 432, the system creates and stores the harmonic compatibility result set based upon the results of step 430. In step 433, the system determines whether the song pairs that are tempo discrete, tempo-concurrent or context concurrent segue scenarios, and stores data related to same as described above. In step 434, the process ends.

Turning to FIG. 4D, steps performed by the mixing module 308 are described. The mixing module 308 starts at step 436, and at step 438, the mixing module 308 looks up potential candidate songs for a current song being played back to the user based upon a tempo-discrete, tempo concurrent and context concurrent segue scenarios. This lookup may be based upon the temporal and harmonic analysis described above. For example, the mixing module may look-up candidate songs based upon a system or user selected segue type or minimum compatibility characteristic for a selected criteria (discussed above). In step 440, the mixing module 308 ranks the potential candidate songs based upon temporal and/or harmonic compatibility. In step 442, the mixing module 308 filters the result list ranked by harmonic compatibility using system-generated preferences and/or user-selected preferences. For example, the user may select to only have song segues (no loops) to songs of a similar genre, or the user may select to have song loops of any harmonically compatible song. In step 444, the mixing module 308 transmits the highest-ranked results in the filtered list to the playback module 310 so that the selected song and segue type (segue or loop) may be selected and played. In step 446, the process ends.

In some embodiments, the mixing module 308 may also include a segue dashboard (described in more detail with reference to FIG. 10) that allows a user to view song pair matches (e.g., the current song and potential candidate songs). As one skilled in the art may appreciate, the segue dashboard may support a variable level of user interaction in choosing segue type, candidate songs, etc. In some embodiments, the segue dashboard supports a variety of user interaction based upon the type of system (e.g., passive radio player, internet/streaming, digital recording playback, etc.). In such embodiments, the format of the dashboard displayed to the user may include options for segue type, a display of various current song/candidate song pair quality metrics, options for attribute weighting for the harmonic and temporal matches between song pairs, and/or options for filter parameters that reduce the number of current song/candidate song pairs. In this regard, the current song/candidate song quality metric may be a system-wide list or table of transposition-specific and location-specific current/candidate segue pairs ranked according to the quality of the song pair temporal and harmonic match. The current song/candidate song pair quality metric may also include a transposition metric indicating any pitch shift that may be required to achieve the proper harmonic mixing quality of the song pair, the swing difference between the candidate and current song pair, the tempo difference between the candidate and current song, and the harmonic quality between the candidate song and the current song. In some embodiments, the dashboard may also assign a weight to the various attributes of the song identified above (e.g., some attributes of the candidate songs may be more important for determining the ranking of the song pairs). The following is an exemplary list of segue attributes or metrics, by segue scenario type, which may be displayed to the system administrator or user in embodiments of the dashboard (e.g., whether the current song/candidate song pair match is tempo-discrete, tempo-concurrent, or context-concurrent):

Tempo-discrete Segue Scenario types:
Candidate Stem Mode
Tempo-concurrent Segue Scenario types:
Candidate Stem Mode
Current/Candidate Loop Worth or Ranking Criteria
Current/Candidate Jump Worth or Ranking Criteria
Context-concurrent Segue Scenario types:
Candidate Stem Mode
Current/Candidate Loop Worth or Ranking Criteria
Current/Candidate Jump Worth or Ranking Criteria
Current/Candidate Virtual Chord Change Worth or Ranking Criteria
Current/Candidate Lead Melodic Content Worth or Ranking Criteria
Phrase play Segue Involvement Worth or Ranking Criteria In some embodiments of the mixing module 308, song pair candidates may be filtered based upon administrator, system, or user-selected parameters. In such embodiments, instructions implementing the mixing module 308 may filter and randomize any of the metrics displayed to the user, allow a user to set a filter preference for candidates by segue scenario, exclude song pairs based upon whether the current song or candidate song should not repeat various drop points, prevent infinite loop scenarios for various song pairs or segue types, and/or may allow for a system administrator or user to pre-listen to the segue pivot period (the interchange between the current song and the candidate song), before the segue to the candidate song (or loop of the current song) is played back in full to the user. In some embodiments, the system may also allow the system administrator to browse previous segue scenario results based upon candidate song, segue scenario type, and overall quality, and to pre-listen to the segue period for each. In some embodiments, the system may also generate a sequential series of multiple next-song segues at one time, each of whose context-concurrent and tempo-concurrent segue is selected based on not only that immediate song pair but on the sequential series of songs as a whole.

Figure 4E:
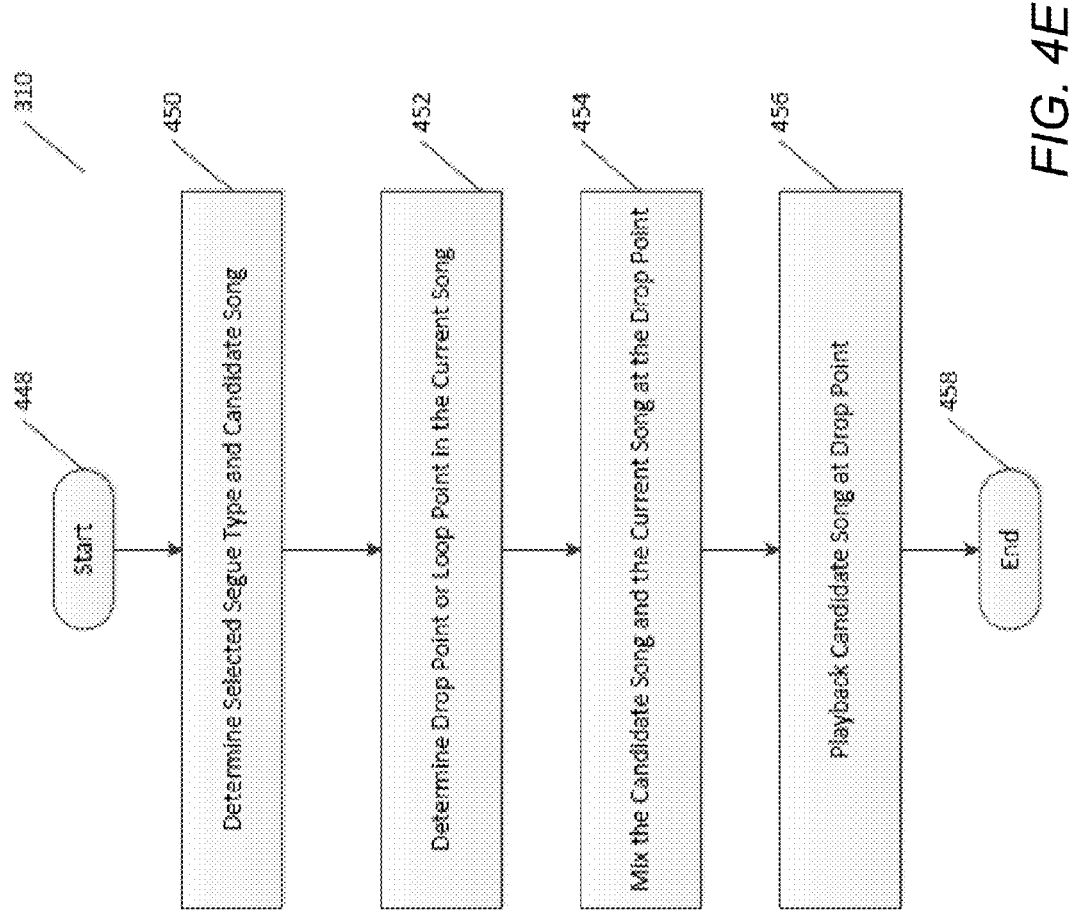

Turning to FIG. 4E, the playback module 310 is described. The playback module 310 is initiated in step 448. In step 450, the playback module determines the selected segue type and candidate song, and in step 452 determines a drop point or loop point in the current song. For example, the current song playing may include metadata that indicates that the drop points in the song are compatible with segues or looping various context objects of the candidate song. In some embodiments, the playback module 310 may include a segue generator that uses the information created by the mixing module, and supplied to the dashboard to generate segues to be used in playback. In step 454, the digital data between the current song and candidate song are mixed at the drop point. For example, the portions of the current song after the drop point may be deleted from the song queue and replaced with data from the candidate song. In some embodiments, this current song and candidate song may be mixed and prepared for playback by an audio engine. In step 456, the playback module plays back the portion of the candidate song inserted into the current song, and in step 458, the process ends.

As one skilled in the art may appreciate, the playback module 310 may also include instructions for a decision tree and/or Bayesian network to determine the candidate song and segue type based upon user- or system-selected parameters in the mixing module 308. For example, the decision tree may select the candidate song using the following: current song/candidate song segue start locations, current song/candidate song transposition amounts, Pair_Stem flag, segue attribute weightings, and current song/candidate song length values. The current song/candidate song segue start locations may be calculated using the harmonic anchor segue start locations of the selected current song/candidate song pair. For example, for tempo-concurrent and context-concurrent segues, these may be drop points as specified within the evaluation process. The current/candidate jump worth metric indicates whether the segue between songs in the song pair is sufficiently distant from the end location of the current song and the start location of the candidate song. As such, the current/candidate jump worth may be calculated based on the last drop(s), first drop(s) of the song pair. For example, the playback module 310 may use a drop point to segue between songs where:

The current song segue start point is set to a sufficiently early location within the song to ensure a sufficiently long playing time, or the current song must play past the drop point location and jump back to the drop point (or repeat a loop a significant number of times) prior to a segue to a candidate song.

The candidate song segue start point is set to a sufficiently late location within the song such that in order to ensure a sufficiently long playing time, the candidate song must jump back to an earlier drop point within the song (or repeat a loop a significant number of times) after the segue completes.

The playback module 310 may also include instructions to calculate the current song/candidate song transposition amounts, which are the amounts that the next song must be pitch-shifted to match the next song as previously evaluated. The Pair_Stem flag is a pair of bits that indicate the type of harmonic content (full ensemble or lead stem) used in the runtime look-up process to identify candidate songs compatible with the current song (e.g., song A Pair_Stem flag is the current song and the song B Pair_Stem flag is the candidate song). These dashboard attribute weightings are forwarded to the decision tree and/or Bayesian network of the playback module to determine the candidate song for playback Turning to FIGS. 5A and 5B, the various tables storing the values described above that are used to determine the list of candidate songs are described therein. For example, the tables shown in FIG. 5A store the metatags created above, and include a song table 502 including a song ID as a primary key, and a song name, stem mode, and song genre as columns therein; a bar/beat map table 504, and includes a song_ID and beat as a primary key and a time_stamp, and tempo to next beat map as columns therein; a lead status mappings table 506 that includes the song ID, and 1/16 note as a primary key and lead status as columns therein; a time signature mappings table 508 that includes a song_ID and downbeat as the primary key and a time signature as a column therein; a key mode dictionary table 510 that includes the key mode ID as a primary key, and the shape, base, and explicit value as the columns therein; a key mode mappings table 512 that includes a song ID and downbeat as the primary key and the key mode ID as a column therein; a swing mappings table 514 that includes the song ID and downbeat location as the primary key and the swing as a column therein; a unique harmonic objects map table 516 that includes the harmonic object ID as a primary key and the song ID, length, and type as columns therein; a chordal context mapping table 518 that includes the harmonic object ID and offset as primary keys and a chord ID as a column therein; a chord dictionary mapping table 520 that includes the chord ID as a primary key, and the shape, base, and explicit value as columns therein; the mono context mappings table 522, which includes the harmonic object ID and offset value as the primary key, and the shape, base, and explicit values as columns therein; the out_key mappings table 524 that includes the harmonic object ID and offset as the primary keys, and the shape, base, and explicit values as the columns therein; the harmonic state anchor mappings table 526, that includes the song ID and downbeat as primary keys, and the song type, harmonic object ID, drop point ID, loop HC start ID, and phrase play ID as columns therein; the drop points table 528 that includes the drop point ID as a primary key and an offset value as the columns therein; the Loop HC starts table 530 that includes the loop HC start ID as the primary key, and offset and length values as the columns therein; and a phrase play segments list table 532 that includes the phrase play ID as the primary key and offset and melody data as columns therein.

Figure 5B:
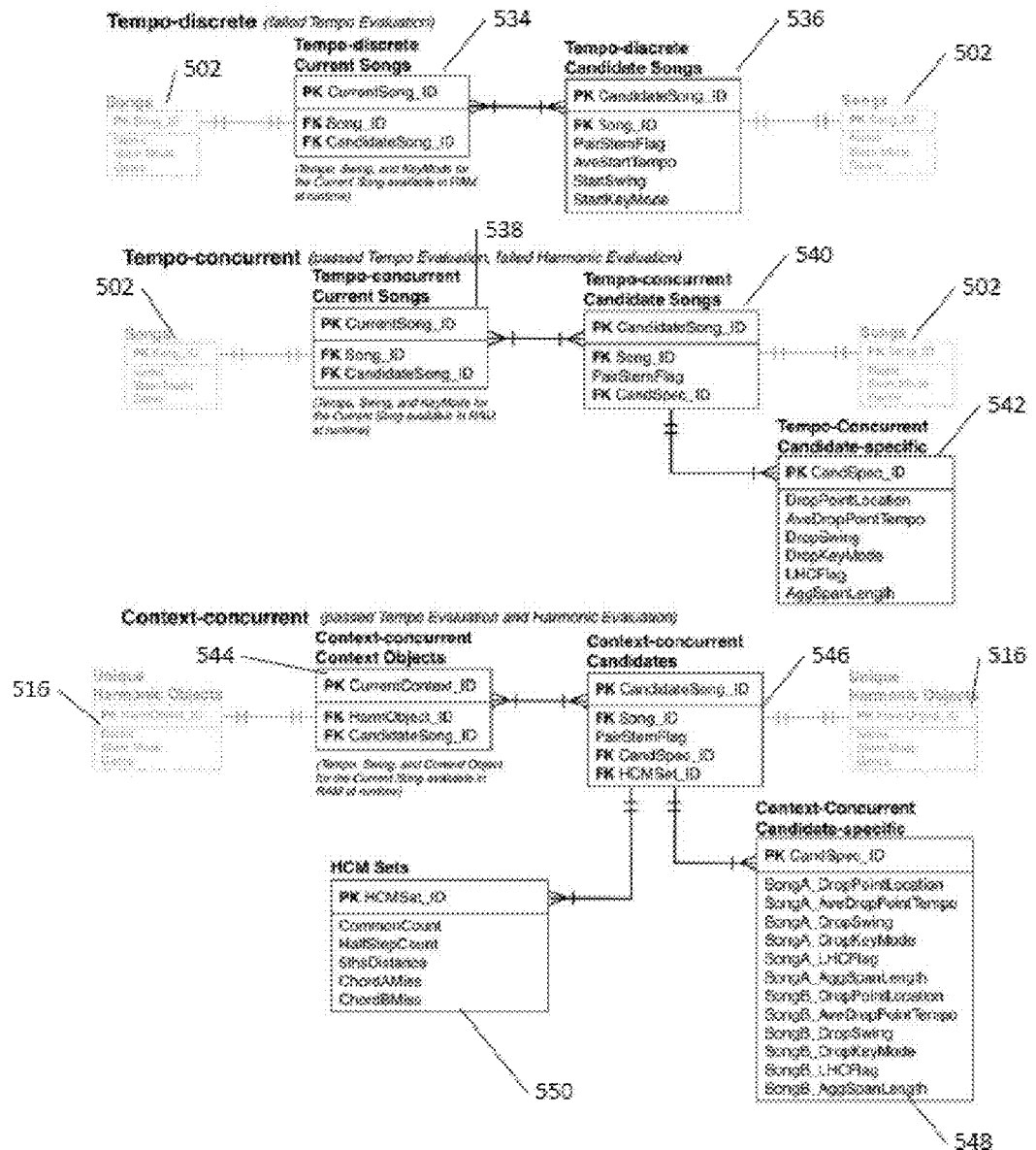

Turning to FIG. 5B, the tempo-discrete, tempo-concurrent, and context-concurrent tables are shown. The tempo-discrete tables may include a tempo-discrete current songs table 534 that includes a current song ID as the primary key, and a song ID and candidate song ID as the columns therein; and a tempo-discrete candidate songs table 536 that may include the candidate song ID as the primary key, and the song ID, Pair_Stem flag, average start tempo, start swing, and start key mode as columns therein. As one skilled in the art may appreciate, each of these tables may link to the songs table (and associated sub-tables) described in FIG. 5A. The tempo-concurrent tables may include a tempo-concurrent songs table 538 that includes a current song ID as the primary key and a song ID and candidate song ID as the columns therein; a tempo-concurrent candidate songs table 540 that may include the candidate song ID as the primary key, and the song ID, Pair_Stem flag, and candidate-specific ID as the columns therein; and a tempo-concurrent candidate-specific table 542 that may include the candidate-specific ID as the primary key, and drop point locations, average drop point tempo, drop swing, and drop key mode, LHC Flag, and agg span length as columns therein. As one skilled in the art may appreciate, the tempo-concurrent tables link to the song table (and associated sub-tables) in FIG. 5A. Finally, the context-concurrent tables may include a context-concurrent context objects table 544 that includes a current song context ID as the primary key, and a harmonic object ID and candidate song ID as the columns therein; a context-concurrent candidates table 546 that may include the candidate song ID as the primary key, and the song ID, Pair_Stem flag, and candidate-specific ID, and HCM flag as the columns therein; a context-concurrent candidate-specific table 548 that may include the candidate-specific ID as the primary key, and a song A drop point location, a song A average drop point tempo, a song A drop swing, a song A drop key Mode, a song A LCH flag, a song A agg span length, a song B drop point location, a song B average drop point tempo, a song B drop swing, a song B drop key Mode, a Song B_LCH flag, and a Song B agg span length; and an HCM sets table 550 that includes a HCM set ID as the primary key, and a common count, half-step count, 5ths distance, chord A miss, and chord B miss as the columns therein. As one skilled in the art may appreciate, the context-concurrent tables link to the unique harmonic objects tables (and associated sub-tables) in FIG. 5A.

As used herein, the following variables in the tables described above may be defined as:

song ID: The song ID, for example, may be an internal song identification, which may be alphanumerical.

song name: The song name, for example, may be the title of the song.

stem mode: The stem mode, for example, may indicate whether the song has stems that are available for analysis. In some embodiments of the invention, the system may support three stem types, lead stems, drum stems or all instruments (the remainder of instruments that are not melodic lead or drums).

song genre: The song genre, for example, may be the song style category (e.g., classical, metal, rock, pop, etc.).

beat: The beat, for example, may be a musical measure of time within the song.

time_stamp: The time stamp, for example, may be the time associated with each beat.

tempo to beat map: The tempo to beat map, for example, may be the tempo occurring at particular beats. For example, some songs may have only a single tempo, so the tempo to beat map would include the tempo at the first beat of the first bar of the song. Other songs may have a plurality of tempos, and each tempo would be associated with the first beat occurring within a bar that has a tempo change.

1/16 note: The 1/16 note is the minimum size of a note or chord for evaluation by the system.

lead status: The lead status, for example, may be the map of the beat bar location together with the lead stem type (e.g., "none," "vocal," "instrumental").

downbeat location: The downbeat location, for example, may be the locations, e.g., bar and time, of various downbeats in a song.

time signature: The time signature, for example, may be the number of beats in a particular bar and may be mapped to the bar where a time signature is initiated. For example, the time signature may be 4/4 time for an entire song, so this time signature is mapped to the first bar.

key mode ID: The key mode ID, for example, may define the nature of the song key using the full 12 note diatonic modes (scales). In some embodiments, where the song leaves a tone from the full 12-note diatonic mode ambiguous, the system also may support two 6-note scales (e.g., minor key, no 6th; major key, no 7th). In this way, the system optimizes the representation of the key by not under-defining a song that makes full use of a 12-note diatonic scale by a simple "key" (i.e., A minor), nor over-defining a song that leaves a tone from the full 12-note diatonic mode ambiguous.

shape: The shape, for example, may be a type of chord object that is stored in a 12-bit bit field, "C"=least significant bit, chord transposed to "C" base, and is octave insensitive.

key mode base: The key mode base, for example, may be another chord object that is an integer representing shape root note, 12-"C" to allow modulo arithmetic on both sides of the transposition.

explicit value: The explicit value, for example, may be a type of chord object that is stored in a 12-bit bit field, "C"=least significant bit, and is octave insensitive.

swing: The swing of the song, for example, may be a space between an off-beat and a successive beat in a song (e.g., in the sound of a heartbeat, da, duh-da, duh da). The swing of a song may also be mapped with respect to the beat of the song (e.g., to indicate the off-beat and successive beat within the bar).

harmonic object ID: The harmonic object ID, for example, may be an indicator representing all unique context objects and out_key objects per song. Together with the harmonic state anchor map, this constitutes a concordance of harmonic structures within the song.

length: The length, for example, may be the length of the context object, or the number of beats and/or bars between the drop points defining the context object.

Type: The type, for example, may be an indicator of the type of harmonic context object, which may be a chordal context object, a mono context object, or an out_key object.

Offset: The offset, for example, may represent any offset that must be applied to the relevant harmonic state anchor map for a particular song to accommodate, for example, drum solos. For example, a negative offset value may indicate that the offset is earlier and a positive value indicates that the offset is later.

chord ID: The chord ID, for example, may be a song chord associated with a particular beat and/or bar.

drop point ID: The drop point ID, for example, may be the identification for each point that indicate the start (or end) of a major section of the song and defines the context objects.

loop HC start ID: The loop HC start ID, for example, may be the location of the starting beat or bar for a context object that can be looped (e.g., repeated). In some embodiments, Loop HC context objects may be a section of continuous chordal context objects without vocal content so it can be easily looped such as the song melody.

phrase play ID: The phrase play ID, for example, may be the identification for phrase play segments. In some embodiments, phrase play segments are portions of the context objects that may include antecedent/consequent segments spanning half of the context object. For example, some songs have a beginning portion that is antecedent and an ending portion that is consequent, so that the context object may be further segmented into two parts, and these two parts may be defined by drop points allowing segues or loops of other candidate songs.

melody data: Melody data or melodic content, for example, may be an indicator that a context object or stem has intrinsic melodic content.

current song ID: The current song ID, for example, may be an alphanumeric indicator for the current song being played back to the user.

candidate song ID: The candidate song ID, for example, may be an alphanumeric indicator for a song that may be played back to the user. In some embodiments, the current song and a candidate song may form a song pair.

Pair_Stem flag: The Pair_Stem flag, for example, may indicate whether the song includes stem content, and possibly the type of stem content.

average start tempo: The average start tempo, for example, may represent the average tempo at the start of the song.

start swing: The start swing of the song, for example, may represent the swing amount during the context object defining the start of the candidate song or In_Key state.

start key mode: The start key mode, for example, may represent the Key_Mode at the start of a song.

drop point locations: Drop point locations, for example, may be the beats and/or bars associated with drop points. In some embodiments, such drop points are the locations that define context objects within a song.

average drop point tempo: The average drop point tempo, for example, may be the average tempo at this first drop/drop point.

drop swing: The drop swing, for example, may be the swing at a particular drop point.

drop key mode: The drop key mode, for example, may be the key mode at a particular drop point rather than the single song key mode.

LHC Flag: The LCH flag, for example, may reflect whether there is also Loop HC object at a particular drop point.

agg span length: The agg span length, for example, may be the aggregate length of contiguous Loop HC context object instances, or remaining In key time a particular drop point.

song A drop point location: The song A drop point location, for example, may be the location of a drop point in song A (or the current song).

song A average drop point tempo. The song A average drop point tempo, for example, may be the average drop point tempo for song A.

song A drop swing: The song A average drop point swing, for example, may be the average drop point swing for song A.

song A drop key mode: The song A drop key mode, for example, may be the drop key mode for song A.

song A_LCH flag: The song A_LCH flag, for example, may indicate whether there is also Loop HC at a particular drop point.

song A agg span length: The song A agg span length, for example, may be the aggregate length of the Loop HC contiguous context object instances, or remaining In_key time a particular drop point in song A.

song B drop point location: The song B drop point location, for example, may be the location of a drop point in song B (or the current song).

song B average drop point tempo. In some embodiments, the song B average drop point tempo is the average drop point tempo for song B.

song B drop swing: The song B average drop point swing, for example, may be the average drop point swing for song B.

song B drop key mode: The song B drop key mode, for example, may be the drop key mode for song B.

song B_LCH flag: The song B_LCH flag, for example, may indicate whether there is also Loop HC at a particular drop point.

song B agg span length: The song B agg span length, for example, may be the aggregate length of the contiguous Loop HC context object instances, or remaining In_key time a particular drop point in song B.

HCM Set ID: The HCM Set ID may be an identifier of a harmonic comparison metric set ("HCM set"). An HCM set, for example, may include a common count metric, a ½ step count metric, a 5th distance metric, a chord A miss, and a chord B miss.

common count: The common count metric, for example, may be the count between common tones in the current song and candidate song chords. In some embodiments, the larger the common count, the better the match between the current song and the candidate song.

half step count: The ½ step count metric, for example, may resent the half step tone relationship between triads of the current song and the candidate song. In some embodiments, the fewer half steps between the tones of the candidate song and the current song, the better the match.

5ths distance: The 5ths distance metric, in some embodiments, may represent the distance in nodes along the circle of 5ths between a song pair, with positive numbers being sharp and negative numbers being flat. As one skilled in the art will appreciate, the 5ths distance is not reciprocal, meaning the distance between nodes of the current song and the candidate song of a song pair is not the same distance as that between the candidate song and the current song.

chord A miss: The chord A miss metric may be the number of tones in the song A chord that do not match any tones in the song B chord or the underlying song B key_mode.

chord B miss: The chord B miss metric may be the number of tones in the song B chord that do not match any tones in the song A chord or the underlying song A key_mode.

Figure 6:
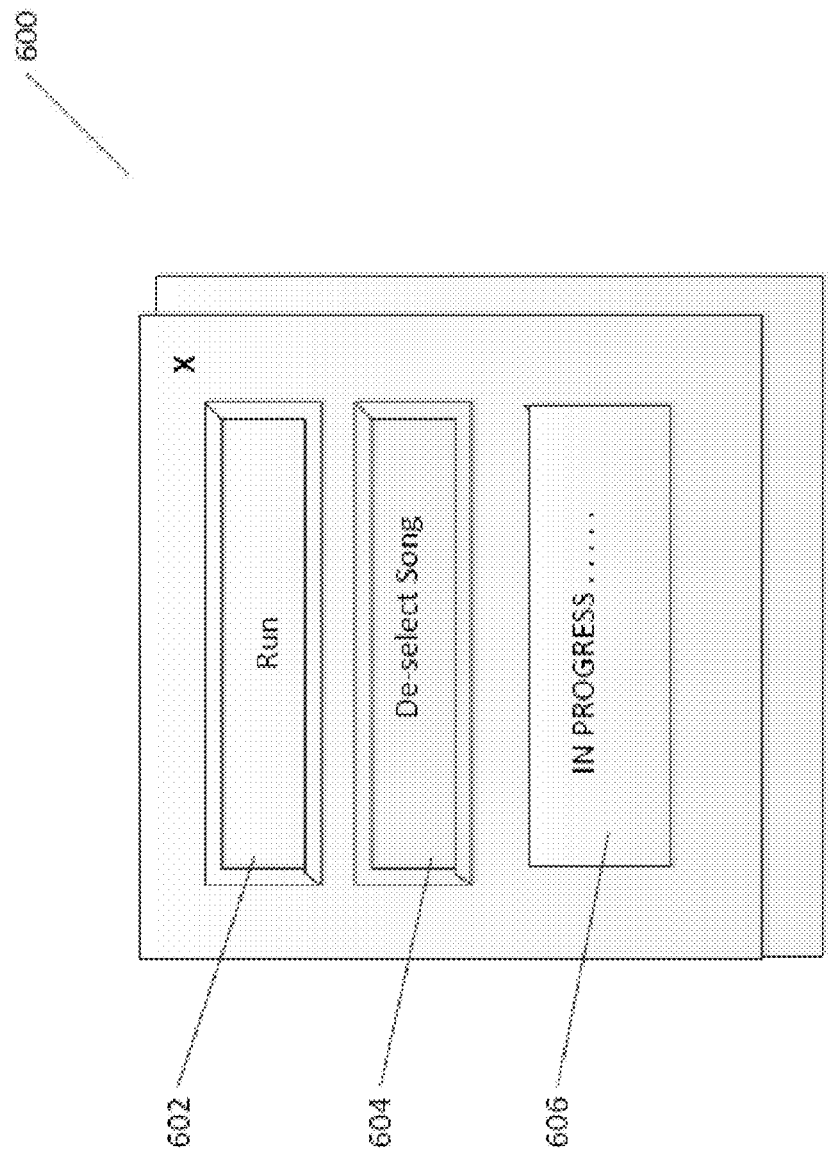
FIG. 6 is an exemplary playlist for use in an embodiment.

Turning to FIG. 6, the display screen 600 presented to the user during song runtime is shown. As can be seen, such a display screen 600 may include a run selection tab 602 so that the user may run the segue and song selection algorithms described herein, a de-selecting song-selection tab 604 so that the user may deselect a song or song pair that is playing from the system, and an in progress display 606 that shows that a song pair is currently playing. As one skilled in the art may recognize, the display screen may include other tabs or indicators, such as indicators for the song playing, the song pair selected, the segue type selected, de-selection tabs for songs and song pairs, etc. As such, the display screen 600 is only exemplary and should not be considered as limiting the scope of the invention.

Figure 10:
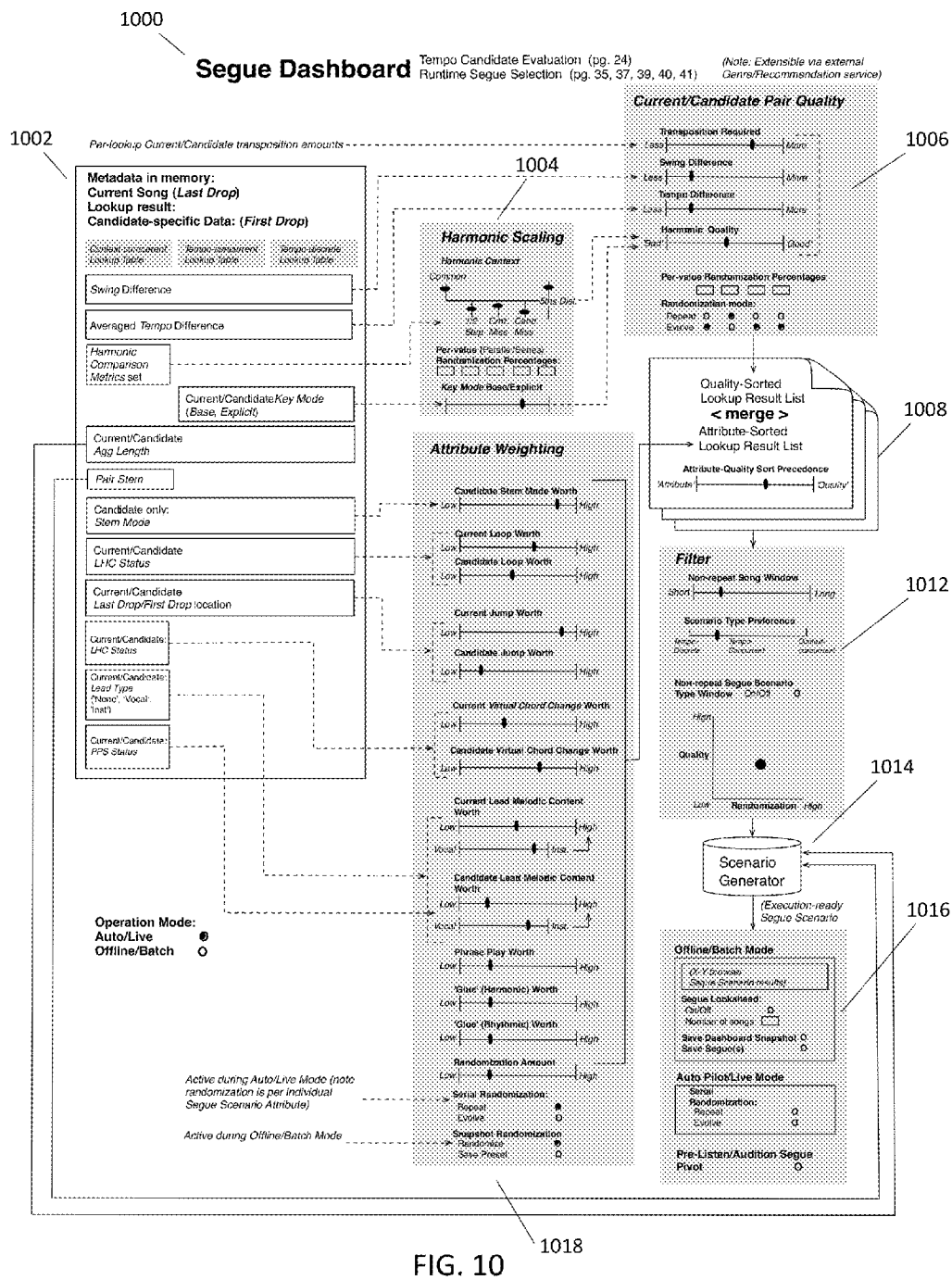
FIG. 10 is a diagram showing the features of a segue dashboard and how such features integrate with song metadata and modules according to an embodiment.

In some embodiments, as discussed above, a system administrator may be present with a user interface for pre-listening and modifying segues prior to playback as a segue dashboard 1000. Turning to FIG. 10, as described above, the segue dashboard 1000 may be generated by either the mixing module 308 or the playback module 310, and both embodiments are included in the scope of this disclosure. Such a segue dashboard 1000 may allow a user to filter current song metadata 1002 using harmonic scaling 1004, current/candidate pair quality 1006, filter 1012, an offline/batch mode 1016, and attribute weighting 1018. For example, the attribute weighting menu 1018 may allow a user or a system administrator to determine the candidate stem mode worth (e.g., a scale from low or high), the current loop worth (e.g., a scale from low or high), the current jump worth (e.g., a scale from low or high), the candidate jump worth (e.g., a scale from low or high), a current virtual chord change worth (e.g., a scale from low or high), a candidate virtual chord change worth (e.g., a scale from low or high), a current lead melodic content worth (e.g., a scale from low or high), a candidate lead melodic content worth (e.g., a scale from low or high), a phrase play worth (e.g., a scale from low or high), a harmonic "glue" worth (e.g., a scale from low or high), a "glue" rhythmic worth (e.g., a scale from low or high), a randomization amount (e.g., a scale from low or high), an indicator regarding whether the serial randomization should repeat or evolve over time (which may be active during auto/live mode), and/or a snapshot randomization indicator that includes a selection of randomize or save preset. The user or system administrator may also be present with an interface to select harmonic scaling 1004, including the harmonic context, randomization percentages, and/or key mode base/explicit selection tab. In some embodiments, the user or system administrator may be presented with selections for current/candidate pair quality including an indicator for the acceptable transposition required for the segue between two songs (e.g., on a scale from less to more), the acceptable swing difference (e.g., on a scale from less to more), the acceptable tempo difference (e.g., on a scale from less to more), the harmonic quality (e.g., on a scale from bad to good), a selection indicator for the per-value randomization percentages and a selection indicator as to whether the randomization indicator should repeat or evolve. In some embodiments, the system administrator or user may be presented with a filter selection 1012 to make the selection as to whether the non-repeat song window should be long or short (e.g., on a scale from short to long), the scenario type preference, e.g., tempo discrete, tempo concurrent, or content-concurrent, an on/off indicator for the segue scenario window, and/or a filter scale for weighting the quality and randomization from low to high respective of each other. In some embodiments, the user may also be presented with an offline/batch mode selection indicator that includes an on/off selection indicator for segue look aheads and the number of songs ahead of the current song to generate segues for, a save tab to save a dashboard snapshot or a segue, an indicator as to whether a segue should be serial random, repeated or evolve, and/or a pre-listen/audition segue pivot selection. As one skilled in the art will appreciate, each of the selection indicators above interact with computer memory, including the scenario generator 1014, the quality sorted look-up results list 1008 generated by the mixing module 308 (sorted, e.g., on an attribute and relative quality scale according to the weighting by the system administrator or user in the attribute weighting 1018), and a generalized representation of song metadata in memory 1002 as discussed above. In this way, the dashboard enables the system administrator or user to control the type and quality of segues generated by the system.

As one skilled in the art may further appreciate, there are various modifications to the modules described that are included within the scope of the invention. For example, in some embodiments, the decision tree and/or Bayesian network for the playback module 310 may also include the current song/candidate song lead melodic content worth to determine whether the lead melodic of the candidate or current song should be used in the segue. The attribute weighting may also be based upon the desirability that any loop content may be repeated. The segue dashboard attribute weighting may also be based on the phrase play segment available lookup results, and represents the desirability ("worth") that phrase play segments are used during the segue period on either the current song or next song. This information is used by the playback module 310 during the segue pivot period to make a best-effort attempt to fulfill the scenario pivot content as requested by the segue dashboard. Note that phrase play segment usage requires that the song has been provided to the system with stem content, and is most effective if both the current and next song are loop HC enabled (in this way the segue can be made sufficiently long enough to repeatedly trigger phrase play segments). Also note that optional hook and ad-lib flags of phrase play segments may be used by the playback module 310 as well. For example, preference may be given to the repetitive use of phrase play segments whose hook flag is set, and a phrase play segment whose ad-lib flag is set due to improvised and/or wordless (e.g., no lyrics) content can be used over existing lead stem content without making the result overly cluttered for the listener (as would be the case with simultaneous sets of lyrics). Note that the playback module 310 may always trigger phrase play segments using the context object-level offsets as defined in metadata. Also note that phrase play segments can musically foreshadow or reprise content during extended segues.

In some embodiments, the current song and next song aggregate length segue attributes may not be weighted by the segue dashboard in the mixing module 308. Rather, the current and next song aggregate length values of the selected song pair may be forwarded to the playback module 310. Depending on the situation, the variable aggregate length can represent the length of a Loop HC, the aggregate length of a set of contiguous context object instances, or the remaining In_Key time. As such, this length is specified in full bars. The playback module 310 uses this value to calculate the Loop HC-based segue pivots to define the loop, to determine the absolute maximum length of a segue period based upon a finite set of contiguous context object instances, or as an In_Key object (tempo-concurrent segue scenario type).

In some embodiments, the segue selected at the segue dashboard in the mixing module 308 may bound the playback module 310 to one of the following three types of segue scenario decision trees and/or Bayesian networks based on the relationship of the two songs or context objects defined by the tempo candidate evaluation and harmonic candidate evaluation processes:

Tempo-discrete Segue Scenario. The dedicated tempo-discrete segue scenario decision tree generates instructions to the runtime audio engine based on the data supplied playback module 310 (see above). Tempo-discrete segue scenarios involve song pairs whose tempos lie outside the default max transposition window and whose context objects are unrelated at any valid transposition value(s). Such song pairs can either be played from current song absolute end to next song absolute start with no modification whatsoever, or (to add listener interest) the end of the current song or the start of the next song can be modified by the system via segue-external operations. Note that although the tempos of this song pair were found to be non-compatible, the static Key_Modes are weighted for both base and modal relationships by the dashboard. The playback module 310 is aware of any such Key_Mode relationship in the selected segue pair, and if a relationship exists the playback module 310 can optionally overlay an external static harmonic "glue" element to bridge the segue. Note that use of external harmonic "glue" elements is also weighted by the dashboard (for the determination of the next song from the potential candidate songs by the decision tree). This decision tree also supports concurrently overlapping sparse lead stem content despite the tempos being discrete (a "vocal mélange" segue effect, see above).

Tempo-concurrent Segue Scenario. The dedicated tempo-concurrent segue scenario decision tree generates instructions to the runtime audio engine based on the data supplied playback module 310 (see above). Tempo-concurrent segue scenarios involve song pairs whose tempos lie within the default max transposition window but whose context objects are unrelated at any valid transposition value(s). Such song pairs can be crossfaded based on at least one song having been provided to the system with stem content (in which case the playback module 310 turns the drum stem into a solo to avoid harmonic clashing), or hard-joined in tempo (i.e., a "butt joint"). As one skilled in the art will appreciate, although no compatible context objects within this song pair may be found, even with modifying the chords by a transposition amount, the static Key_Modes of both songs in the song pair are weighted for base and modal relationships by the dashboard. The playback module 310 is aware of any such relationship in the selected song pair, and if these variables are calculated may overlay an external static harmonic "glue" element to bridge the segue. As one skilled in the art will also appreciate, use of external harmonic "glue" elements is also weighted by the dashboard for use in determining a song pair.

Context-Concurrent Segue Scenario. The dedicated context-concurrent segue scenario decision tree generates instructions to a runtime audio engine, or playback module 310, based on the data supplied playback module 310 Interface (see above). Context-concurrent segue scenarios involve context object pairs whose tempos lie within the default max transposition window and from which one or more context object pairs are related at one or more valid transposition value(s). Note that this includes examining the transposition values to determine if a virtual chord change is required (see above).

As should be understood from the foregoing, in some embodiments the system may support batch processing of multiple segues and present a system administrator with audio of the segue periods to pre-listen/modify as a set or playlist of segues before such segues are presented to listeners. In such embodiments, the scenarios that are pre-listened to and/or modified are stored in memory for retrieval during playback.

The playback module 310 may use these exemplary decision trees to base the instructions it sends to a runtime audio engine (e.g., which may generate the song data for playback). An abbreviated version of each is provided for illustrative purposes, and should not be considered limiting on the invention: Decision Tree A: Tempo-discrete Decision Tree; Decision Tree B: Tempo-concurrent Decision Tree;

Decision Tree C: Context-concurrent Decision Tree. As one skilled in the art will appreciate, the exemplary decision trees assume that songs are provided to the system with stem content (the full mix cases serve to depict the non-stem scenario), but this should not be limiting on the invention. The decision trees are structured in such a way that time moves from left to right rather than vertically (i.e., two elements at the same indentation constitute a branching <or> clause. In the exemplary decision trees, each end of each branch (i.e., the deepest level of indentation) is intended that data provided by the runtime lookup processes, dashboard (see playback module 310 interface with the mixing module 308 above), along with various other metadata already described herein (such as the phrase play segment optional flags), may be sufficiently rich enough to inform the algorithmic decisions ultimately taken by the playback module 310 (and/or weight randomization towards those decisions).

For example, exemplary decisions trees may be:

Decision Tree A: Tempo-discrete Decision Tree

<All out via fade or *DJ FX*>  CURRENT SONG COMPLETES, NEXT SONG starts

<Jump back to earlier *Drop Point* on *Full Mix*>

<*Full Mix* out via fade or *DJ FX*>  CURRENT SONG COMPLETES, NEXT SONG starts <Loop HC>

<Full Mix out via fade or *DJ FX*>  CURRENT SONG COMPLETES

<*Jump back* to earlier *Drop Point* on *Lead* stem solo >   (note: also applies to *BGVoc Extras* stem)

<Lead stem out via fade or *DJ FX*>  CURRENT SONG COMPLETES, NEXT SONG starts <NEXT SONG starts concurrently (out of tempo) on solo vocals (vocal melange) or

*Drum* and/or All Inst stem>

<Add *Drum* stem>

<All out via fade or *DJ FX*>  CURRENT SONG COMPLETES, NEXT SONG starts

<Lead stem out via fade or out after phrase, then *Drum* stem out via fade or *DJ FX*>  CURRENT SONG COMPLETES <Add *All Inst* stem>

<All out via fade or *DJ FX*>  CURRENT SONG COMPLETES, NEXT SONG starts

<Lead stem out via fade or out after phrase, then *Drum*/All Inst stem out via fade or *DJ FX*> CURRENT

SONG COMPLETES

<Add *All Inst* stem>

<All out via fade or *DJ FX*> CURRENT SONG COMPLETES, NEXT SONG starts

<Lead stem out via fade or out after phrase, then All Inst stem out via fade or *DJ FX*> CURRENT

SONG COMPLETES

<Add *Drum* stem>

<All out via fade or *DJ FX*> CURRENT SONG COMPLETES, NEXT SONG starts

<Lead stem out via fade or out after phrase, then *Drum*/All Inst stem out via fade or *DJ FX*> CURRENT

SONG COMPLETES

<*Jump back to earlier Drop Point* on *Drum* stem solo>

< *Drum* stem out via fade or *DJ FX*> CURRENT SONG COMPLETES, NEXT SONG starts

<Add *All Inst* stem>

<All out via fade or *DJ FX*> CURRENT SONG COMPLETES, NEXT SONG starts

<*Drum* stem out via fade or *DJ FX*, then All Inst stem out via fade or *DJ FX*> CURRENT SONG

COMPLETES

<Loop HC>

<Add *All Inst* stem>

<All out via fade or *DJ FX*>　CURRENT SONG COMPLETES, NEXT SONG starts

<*Drum* stem out via fade or *DJ FX*>　All Inst stem solo

<All Inst stem out via fade or *DJ FX*>　CURRENT SONG COMPLETES, NEXT SONG starts <Add Phrase Play segments>

<All out via fade or *DJ FX*>　CURRENT SONG COMPLETES, NEXT SONG starts

<*Drum* stem out via fade or *DJ FX*, then All Inst stem out via fade or *DJ FX*>　Phrase Play segments solo <NEXT SONG starts concurrently (out of tempo) on solo vocals (vocal melange) or

*Drum* and/or All Inst stem>

<Phrase Play segments out via fade or out after phrase> CURRENT SONG COMPLETES, NEXT SONG starts <Add Phrase Play segments>

<All out via fade or *DJ FX*>　CURRENT SONG COMPLETES, NEXT SONG starts

<*Drum* stem out via fade or *DJ FX*>　Phrase Play segments solo

<NEXT SONG starts concurrently (out of tempo) on solo vocals (vocal melange) or *Drum* and/or All Inst stem>

<Phrase Play segments out via fade or out after phrase>

CURRENT SONG COMPLETES, NEXT SONG starts

<Add *All Inst* stem>

<All out via fade or *DJ FX*> CURRENT SONG COMPLETES, NEXT SONG starts

< Phrase Play segments out via fade or out after phrase> All Inst stem solo

<All Inst stem out via fade or *DJ FX*> CURRENT SONG COMPLETES, NEXT SONG starts <Add *All Inst* stem>

<All out via fade or *DJ FX*> CURRENT SONG COMPLETES, NEXT SONG starts

<*Drum* stem out via fade or *DJ FX*, then Phrase Play segments out via fade or *DJ FX*> All Inst stem solo <All Inst stem out via fade or *DJ FX*> CURRENT SONG COMPLETES, NEXT SONG starts <*Jump back to earlier Drop Point* on *All Inst* stem solo>

< All Inst stem out via fade or *DJ FX*> CURRENT SONG COMPLETES, NEXT

SONG starts

<Add *Drum* stem>

<All out via fade or *DJ FX*> CURRENT SONG COMPLETES, NEXT SONG starts

<All Inst stem out via fade or *DJ FX*, then *Drum* stem out via fade or *DJ FX*> CURRENT SONG COMPLETES, NEXT SONG starts <Loop HC>

<Add *Drum* stem>

<All out via fade or *DJ FX*> CURRENT SONG COMPLETES, NEXT SONG starts

<All Inst stem out via fade or *DJ FX*> *Drum* stem solo

<*Drum* stem out via fade or *DJ FX*> CURRENT SONG COMPLETES, NEXT SONG starts <NEXT SONG starts concurrently (out of tempo) on solo vocals (vocal melange), then *Drum* stem out via fade or *DJ FX*>

<Add Phrase Play segments>

<All out via fade or *DJ FX*> CURRENT SONG COMPLETES, NEXT SONG starts

<All Inst stem out via fade or *DJ FX*, then *Drum* stem out via fade or *DJ FX*> Phrase Play segments solo <NEXT SONG starts concurrently (out of tempo) on solo vocals (vocal melange) or

*Drum* and/or All Inst stem>

<Phrase Play segments out via fade or out after phrase> CURRENT SONG COMPLETES, NEXT SONG starts <Add Phrase Play segments>

<All out via fade or *DJ FX*> CURRENT SONG COMPLETES, NEXT SONG starts

<All Inst stem out via fade or *DJ FX*> Phrase Play segments solo

<NEXT SONG starts concurrently (out of tempo) on solo vocals (vocal melange) or *Drum* and/or All Inst stem>

<Phrase Play segments out via fade or out after phrase>

CURRENT SONG COMPLETES, NEXT SONG starts

<Add *Drum* stem>

<All out via fade or *DJ FX*> CURRENT SONG COMPLETES, NEXT SONG starts

<Phrase Play segments out via fade or out after phrase> *Drum* stem solo

<*Drum* stem out via fade or *DJ FX*> CURRENT SONG COMPLETES, NEXT SONG starts

<Add *Drum* stem>

<All out via fade or *DJ FX*> CURRENT SONG COMPLETES, NEXT SONG starts

<All Inst stem out via fade or *DJ FX*, then Phrase Play segments out via fade or *DJ FX*> *Drum* stem solo

*<Drum stem out via fade or DJ FX>* CURRENT SONG COMPLETES, NEXT SONG starts

Decision Tree B: Tempo-concurrent Decision Tree

*Pair_Stem* = ('None', 'None')

CURRENT SONG end to NEXT SONG start

<Hard 'butt-joint' splice>

<2 beats or 1 bar silent pause in tempo>

<External rhythmic 'glue' element bridges 1-2 bar gap in tempo>

*Pair_Stem* = ('None', 'Poly') OR ('None', 'Mono')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *In_Key* && NEXT SONG *First Drop(s).Drop*

*Point* = *In_Key*

<NEXT SONG starts concurrently on NEXT SONG *Drum* stem, fixed segue period =

CURRENT SONG *Agg Length*>

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump Back* or *Loop HC* >

CURRENT SONG *Last Drop(s).Drop Point* = (*In_Key* or *context object*) && NEXT SONG *First Drop(s).Drop Point* = *context object*

<NEXT SONG starts concurrently on NEXT SONG Drum stem, fixed segue period = CURRENT SONG *Agg Length*>

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external Jump Back* or *Loop HC*>

CURRENT SONG *Last Drop(s).Drop Point* = *Loop HC* && NEXT SONG *First Drop(s).Drop Point* = *In_Key*

<NEXT SONG starts concurrently on NEXT SONG Drum stem, fixed segue period = NEXT SONG *Agg Length* value>

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-*

*external Jump Back* or *Loop HC*>

CURRENT SONG *Last Drop(s).Drop Point* = *Loop HC* && NEXT SONG *First Drop(s).Drop*

*Point* = *context object*

<NEXT SONG starts concurrently on NEXT SONG Drum stem, segue period can be freely looped>

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external Jump Back* or

*Loop HC*>

*Pair Stem* = ('Poly', 'None') OR ('Mono', 'None')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *In_Key* && NEXT SONG *First Drop(s).Drop*

*Point* = *In_Key*

<NEXT SONG starts concurrently on CURRENT SONG *Drum* stem, fixed segue period equal to NEXT SONG *Agg Length*>

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *context object* && NEXT SONG *First*

*Drop(s).Drop Point* = *(In_Key* or *context object)*

<NEXT SONG starts concurrently on CURRENT SONG Drum stem, fixed segue period =

NEXT SONG *Agg Length* value>

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<After crossfade, NEXT SONG is checked for playing time - consider *Segue-external*

*Jump Back* or *Loop HC*>

CURRENT SONG *Last Drop(s).Drop Point = In_Key* && NEXT SONG *First Drop(s).Drop*

*Point = Loop HC*

<NEXT SONG starts concurrently on CURRENT SONG Drum stem, fixed segue period =

CURRENT SONG *Agg Length*>

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<After crossfade, NEXT SONG is checked for playing time - consider *Segue-*

*external Jump Back* or *Loop HC*>

CURRENT SONG *Last Drop(s).Drop Point* ==*context object* && NEXT SONG *First Drop(s).Drop Point* = *Loop HC*

<NEXT SONG starts concurrently on CURRENT SONG Drum stem, segue period can be freely looped)>

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping /crossfading to NEXT SONG *Drum* stem>

<After crossfade, NEXT SONG is checked for playing time - consider *Segue-external Jump Back* or *Loop HC*>

*Pair_Stem* = ('Poly', 'Poly') OR ('Mono', 'Poly') OR ('Poly', 'Mono') OR ('Mono', 'Mono')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *In_Key* && NEXT SONG *First Drop(s).Drop Point* = *In_Key*

<NEXT SONG starts concurrently on NEXT SONG *Drum* stem, fixed segue period = NEXT SONG *Agg Length*>

<NEXT SONG starts concurrently on CURRENT SONG Drum stem, segue period can be freely looped>

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump Back* or *Loop HC* >

CURRENT SONG *Last Drop(s).Drop Point* = *context object* && NEXT SONG *First Drop(s).Drop Point* = *context object*

<NEXT SONG starts concurrently on NEXT SONG Drum stem, segue period can be freely looped>

<NEXT SONG starts concurrently on CURRENT SONG Drum stem, segue period can be freely looped>

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

*<After crossfade, NEXT SONG is checked for playing time - consider Segue-external Jump Back or Loop*

*HC>*

Decision Tree C: Context-concurrent Decision Tree

*Pair_Stem* = ('None', 'None')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

*Pair_Stem* = ('None', 'Poly')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *context object* && NEXT SONG *First Drop(s).Drop Point* = *Loop HC*

<NEXT SONG starts concurrently on NEXT SONG (polyphonic) *Lead* stem/*Phrase Play* segments, fixed segue period = CURRENT SONG *Agg Length*>

(note NEXT SONG *Drum* stem can overlap CURRENT SONG pre-segue)

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *Loop HC* && NEXT SONG *First Drop(s).Drop*

*Point* = *Loop HC*

<NEXT SONG starts concurrently on NEXT SONG (polyphonic) *Lead* stem/*Phrase Play* segments, segue period can be freely looped>

(note NEXT SONG *Drum* stem can overlap CURRENT SONG pre-segue)

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external*

*Jump Back* or *Loop HC*>

*Pair_Stem* = ('None', 'Mono')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *context object* && NEXT SONG *First Drop(s).Drop Point* = *Loop HC*

<NEXT SONG starts concurrently on NEXT SONG (monophonic) *Lead* stem/*Phrase Play* segments, fixed segue period = CURRENT SONG *Agg Length*>

(note NEXT SONG *Drum* stem can overlap CURRENT SONG pre-segue)

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump Back* or *Loop HC*>

CURRENT SONG *Last Drop(s).Drop Point* = *Loop HC* && NEXT SONG *First Drop(s).Drop Point* = *Loop HC*

<NEXT SONG starts concurrently on NEXT SONG (monophonic) *Lead* stem/*Phrase Play* segments, segue period can be freely looped>

(note NEXT SONG *Drum* stem can overlap CURRENT SONG re-segue)

<'GLUE' external rhythmic element concurrent with segue, pre-segue optionally crossfading from/overlapping CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external Jump Back* or *Loop HC*>

*Pair_Stem* = ('Poly', 'None')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *context object* && NEXT SONG *First Drop(s).Drop Point* = *Loop HC*

<NEXT SONG starts concurrently on CURRENT SONG (polyphonic) *Lead* stem/*Phrase Play* segments, fixed segue period = CURRENT SONG *Agg Length*>

(note CURRENT SONG *Drum* stem can overlap NEXT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<NEXT SONG checked for sufficient playing time left, consider *Segue-external Jump Back* or *Loop HC* >

CURRENT SONG *Last Drop(s).Drop Point* = *Loop HC* && NEXT SONG *First Drop(s).Drop Point* = *Loop HC*

<NEXT SONG starts concurrently on CURRENT SONG (polyphonic) *Lead* stem/*Phrase Play* segments, segue period can be freely looped>

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<After crossfade, NEXT SONG is checked for playing time - consider *Segue-external Jump Back* or *Loop HC*>

*Pair_Stem* = ('Poly', 'Poly')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *Loop HC* && NEXT SONG *First Drop(s).Drop*

*Point* = *Loop HC*

< CURRENT SONG and NEXT SONG (polyphonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue post-segue optionally crossfading from/replacing CURRENT SONG *Drum* stem>

<'GLUE' external rhythmic element concurrently with segue, optionally replacing/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *Loop HC* && NEXT SONG *First Drop(s).Drop*

*Point* = *Loop HC*

< CURRENT SONG and NEXT SONG (polyphonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external*

*Jump Back* or *Loop HC*>

*Pair_Stem* = ('Poly', 'Mono')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *Loop HC* && NEXT SONG *First Drop(s).Drop*

*Point* = *Loop HC*

<CURRENT SONG (polyphonic) and NEXT SONG (monophonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *Loop HC* && NEXT SONG *First Drop(s).Drop*

*Point* = *Loop HC*

<CURRENT SONG (polyphonic) and NEXT SONG (monophonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external*

*Jump Back* or *Loop HC*>

*Pair_Stem* = ('Mono', 'None')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = context object && NEXT SONG *First Drop(s).Drop Point* = *Loop HC*

<NEXT SONG starts concurrently on CURRENT SONG (monophonic) *Lead* stem/*Phrase Play* segments, fixed segue period = CURRENT SONG *Agg Length*>

(note CURRENT SONG *Drum* stem can overlap NEXT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *Loop HC* && NEXT SONG *First Drop(s).Drop*

*Point* = *Loop HC*

<NEXT SONG starts concurrently on CURRENT SONG (monophonic) *Lead* stem/*Phrase Play* segments, segue period can be freely looped>

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally overlapping/crossfading to NEXT SONG *Drum* stem>

<After crossfade, NEXT SONG is checked for playing time - consider *Segue-external*

*Jump Back* or *Loop HC*>

*Pair_Stem* = ('Poly', 'Poly')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *Loop HC* && NEXT SONG *First Drop(s).Drop*

*Point* = *Loop HC*

< CURRENT SONG and NEXT SONG (polyphonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue pre-segue, optionally crossfading from/replacing CURRENT SONG *Drum* stem>

<'GLUE' external rhythmic element concurrently with segue post-segue, optionally replacing/crossfading to NEXT SONG *Drum* stem>

<NEXT SONG checked for sufficient playing time left, consider *Segue-external Jump*

*Back* or *Loop HC* >

CURRENT SONG *Last Drop(s).Drop Point* = *Loop HC* && NEXT SONG *First Drop(s).Drop*

*Point* = *Loop HC*

< CURRENT SONG and NEXT SONG (polyphonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external*

*Jump Back* or *Loop HC*>

*Pair Stem* = ('Poly', 'Mono')

CURRENT SONG end to NEXT SONG start

<Hard 'butt-joint' splice>

<2 beats or 1 bar silent pause in tempo>

<External rhythmic 'glue' element bridges 1-2 bar gap in tempo>

CURRENT SONG *Last Drop(s) Drop Point* to NEXT SONG *First Drop(s) Drop Point*

CURRENT SONG *Last Drop(s).Drop Point* = *Loop HC* && NEXT SONG *First Drop(s).Drop Point* = *Loop HC*

<CURRENT SONG (polyphonic) and NEXT SONG (monophonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<NEXT SONG checked for sufficient playing time left, consider *Segue-external Jump Back* or *Loop HC* >

CURRENT SONG *Last Drop(s).Drop Point = Loop HC* && NEXT SONG *First Drop(s).Drop*

*Point = Loop HC*

<CURRENT SONG (polyphonic) and NEXT SONG (monophonic) *Lead* stem/*Phrase Play* segments as concurrent pivot, segue period can be freely looped>

(note CURRENT SONG *Drum* stem can replace NEXT SONG *Drum* stem post-segue)

(note NEXT SONG *Drum* stem can replace CURRENT SONG *Drum* stem pre-segue)

<'GLUE' external rhythmic element concurrent with segue, pre-segue optionally crossfading from/replacing CURRENT SONG *Drum* stem>

<'GLUE' external rhythmic element concurrently with segue, post-segue optionally replacing/crossfading to NEXT SONG *Drum* stem>

<After crossfade, NEXT SONG is checked for playing time - consider *Segue-external*

*Jump Back* or *Loop HC*>

As previously mentioned, additional functions may also be supported by the playback module 310, including an audio engine with a mixer, tempo conformance, pitch shift, virtual chord changes, triggering, lead stem level control, external glue elements, and next-current handoff. During a segue scenario, operational instructions are sent from the scenario generator to the runtime audio engine for execution. These operations include triggering or changing audio levels, pausing/re-triggering context objects at various bar/beat locations within the song (as defined by musical bar/beat locations), and the dynamic control over audio special effects processing. The runtime audio engine supports two "channels" each populated by a next song, or candidate song that has been selected for playback, in an alternating fashion (much like a traditional DJ turntable workflow). In some embodiments, both of these channels may have identical "track" structures, with each track containing dedicated transport, level, and stereo pan controls. As such, each track may be dedicated to a specific stem type. In addition, a small selection of audio special effect modules such as filters, delays, and reverbs may be supported by the audio playback module (for example, both as inline modules and via traditional sends and returns for multiple track processing). As one skilled in the art will appreciate, the audio playback engine may also include instruction enabling the user to play back any required non-song, or "glue" content.

Prior to runtime, it may be determined that current/next song pairs eligible for tempo-concurrent and context-concurrent segue scenarios have compatible averaged tempos by the tempo candidate evaluation process. During the runtime execution of a segue by the audio engine, these current and next song tempos may be conformed (aligned). This alignment consists of gradually altering the tempo of each song in such a way that the system tempo gradually (imperceptibly) changes from the current song tempo to the next song tempo over the course of the tempo conform period, an (absolute) time period defined in a system configuration variable. As one skilled in the art will appreciate, the tempo conform period may be independent of the segue scenario period itself. In other words, the tempo conform period may start before and end after the segue scenario period. As such, the tempo conform period start/end times may be calculated based on the segue start location (see below), and per-beat tempo warping is applied to both songs in such a way that the tempo arrives at the next song tempo by the end of the tempo conform period. As one skilled in the art will appreciate, during tempo conformance the time stretching amount is updated at the individual beat level. In other words, the system may not time-stretch songs with subtly fluctuating (human-performed) tempos to force a static tempo. In such embodiments, it is intended that this tempo change be imperceptible to the listener. Because the human ear is less sensitive to tempo change towards the beginning of a piece of music rather than towards the end (at which point the listener is more accustomed to unchanged tempo), the tempo conform period is back-timed in such a way that the handoff point at which the next song assumes "current" status (dependent on segue scenario) may occur at 0.381966 (the lesser golden ratio segment) of the tempo conform period. This leaves the majority of the tempo conform period (0.618034, or the greater golden ratio subperiod) for the tempo conformance. As one skilled in the art will appreciate, the values of the tempo conform period and the maximum tempo differential is interdependent. For example, to ensure that any tempo conformance operation remains unnoticed by the listener, an informal threshold tempo change rate is considered to be one beat per minute every seven seconds).

In much the same manner, the runtime system, in some embodiments, supports a subtle amount of time-shifting to make as many song pairs compatible with each other for tempo-concurrent segues as possible, the system also may support a subtle amount of real-time pitch-shifting (in ½ step increments) to maximize the number of song context object pairs compatible with each other for context-concurrent segues. Note that for song pairs that are not context-concurrent, the same occurs at the Key_Mode level. Again, the amount of digital audio signal processing may be limited so the maximum amount of any pitch-shifting applied to a song is limited by the default maximum time transposition system configuration parameter (depending on the pitch-shifting algorithm, and amounts up to ±2 half steps are found to be imperceptible by the casual listener). As one skilled in the art will appreciate, because pitch-shifting in either direction (up or down) could result in a varying amount of audible artifacts dependent on the nature of the content and the algorithm used, the maximum amount of allowable pitch shift can be set independently in either direction (up/down) at the system configuration level. As one skilled in the art will also appreciate, unless a virtual chord change (see below) is being executed, songs are transposed by the runtime system for the duration of a song in such embodiments. In some embodiments, to optimize performance, pitch-shifting algorithms may be optimized for each stem content type (full mix, drum stem, lead stem, etc.) in a song.

To reflect the fact that the aesthetically acceptable range of pitch-shifting is greater in the absence of vocals, in some embodiments, the playback module 310 supports an additional (wider) transposition range for use to enable virtual chord changes (see below). In such embodiments, the maximum amount of allowable pitch shift can also be set independently in either direction (up/down) at the system configuration level. As one skilled in the art will appreciate, virtual chord changes may enable a wider range of context-concurrent segue scenarios, and allow the runtime system to avoid becoming "trapped" within a single key mode base or diatonic modal relationship across a series of multiple context-concurrent songs (note that virtual chord changes are not supported for use with tempo-concurrent/harmonic context-discrete or tempo-concurrent/harmonic context-discrete segue scenarios). Unlike the subtle song-length time-stretching and pitch-shifting operations performed by the audio engine to allow a larger number of songs to segue seamlessly, a virtual chord change is an obvious "musical" pitch transposition performed at a musically coherent time (i.e., a downbeat) over currently playing audio. Therefore, placement of a virtual chord change depends on whether the virtual chord change occurs during the current song or the next song/current song:

Current song virtual chord changes may occur shortly before a segue scenario to a next song.

Next song virtual chord changes may be put in place prior to the segue (i.e., prior to the playback of the next song), and resolve shortly after the segue scenario is completed.

Virtual chord change conditions may be as follows:

To ensure acceptably realistic results at a wider transposition range, in some embodiments, virtual chord changes may be only implemented on all instrumental stems (i.e., avoiding lead and drum stem content), and thus are only valid for songs provided to the system with stem content. The playback module 310, in these embodiments, detects virtual chord change scenarios by transposition amount, and ensures that no lead stem content is played from a song in which a virtual chord change is currently in effect (instructing the audio engine to lower lead stem prior to the virtual chord change, if necessary).

Since a virtual chord change requires the transposition of the current song (shortly before the segue) or the return of the next song from transposition (shortly after the segue), the runtime system must have access to additional time. Therefore, a virtual chord change can only occur over a Loop HC. Note that this also ensures that sufficient time is available for the playback module 310 to instruct the audio engine to lower the lead stem if necessary.

In some embodiments, all stems within a given song and that given song's master recording are treated atomically. In other words, this stem content is continuously time-aligned, triggered as a unit (with musically relevant offsets), and paused as a unit (if called for by any intra-song DJ-like build/breakdown scenarios). After triggering, the runtime system maintains a counter of the current song bar/beat location read from the full mix track. The current song is handed off to the next song (as selected by the runtime system) at the completion of a segue scenario.

The system can be made aware of the presence and type of lead melodic content at any point during playback of a current song provided to the system with stem content via the lead status map in that song's metadata. The playback module 310 is also able to lower the pitch of lead stems dynamically as called for by various scenarios, such as those in which a "stem mode" song enters into a Loop HC as part of a segue scenario, and must lower the pitch of the vocal track to achieve a Loop HC-compliant lead status of "None." In this case, the audio engine is responsible for using the lead status map to detect pauses in which a lead stem track level can be lowered (i.e., creating a lead status="None" state dynamically) without truncating phrases, if requested by the playback module 310 to lower the lead stem. To allow such "surgical" behavior when lowering the lead stem pitch, the lead status map may support 1/16th note resolution. In the event such a "surgical" phrase-level removal of lead content is not possible in a given situation, as a "fallback" gentle fade-ins/fadeouts are supported. Note that a lead status='None' state created in this fashion overrides the current value as defined in the song metadata lead status map. Also note that antecedent/consequent delineation points as defined for phrase play segment delimitation can also be used at runtime system to avoid truncating phrases when lowering lead stem tracks over other instances of the same context object the phrase play segment is bound to.

In some embodiments, the system supports the enhancement of both (intra-song) playback and (inter-song) segues via an extensible library of external "glue" content for use within segue scenarios as musical bridging support material. This content may be either harmonic or rhythmic.

Harmonic glue elements are harmonically static "pads" intended to be compatible across related Key_Modes. Note that to maximize compatibility of moving chords, content is relatively harmonically sparse: Harmonic glue elements may be primarily made up of single notes, 5ths intervals, 7ths intervals, or suspended chords rather than triads, and are primarily used to bridge tempo-discrete or tempo-concurrent song pairs whose Key_Modes are found by the segue generator to be related (either by base tone or mode). The duration of a harmonic glue element may typically be limited to a period equal to or slightly longer than the segue period, and entrances/exits can be gradual or sudden, timed to song musical beat locations. As one skilled in the art will appreciate, such harmonic glue elements could also serve as a branded mnemonic specific to an online music service. Harmonic glue elements may be stored as audio in as many multiply-pitched instances as needed to accommodate all pitches via a limited amount of pitch-shifting. Note that non-static midi-based harmonic glue elements that could follow song chord changes already in metadata could also be supported.

Rhythmic glue elements may be rhythmic percussive parts of varying instrumentation, styles, tempos, and musical density that can be used during tempo-concurrent and context-concurrent segues to augment any segue pivot. Rhythmic glue elements can easily start well before or end well after the segue period. As one skilled in the art will appreciate, in the case of songs provided to the system with stem content, a rhythmic glue element could replace drum stem content for a substantial part (or the entire duration) of the song. As such, rhythmic glue elements are audio files that can be tempo-conformed (see above) in the same manner of song content. Note, in some embodiments a scenario can specify that a rhythmic glue element is to be used concurrently with a harmonic glue element.

In some embodiments, non-song musical content may be inserted as part of a segue. This non-song musical content may consist of advertising with backing music or of short musical/sound logos known as "mnemonics" (e.g., the "Intel Inside" musical figure). Such musical/sound logos may serve to brand the music service licensee (e.g., a station ID "button"). For example, the playback module 310 may include instructions that at a particular time, or after a particular number of songs have played, the segue between songs would be to such non-song musical content. Such content could overlap the end portion of the current song (as is the case with song-to-song segues) or begin immediately and contiguously at the end of the current song in such a way as to be rhythmically continuous in terms of tempo (as related to the current song) and/or harmonically continuous in terms of key and/or mode (as related to the current song). In some embodiments, content is provided to the listener with an advertising experience that is as non-interruptive as possible and thus increase advertising effectiveness and user retention. In the case of advertising, such underlying non-song musical content could be expressly created for the purpose of accompanying advertising or could consist of instrumental (non-vocal) sections/stems of other (non-related) songs. To match a variety of current songs with varying tempos and key/modes, such non-song musical content could be modular (selected and delivered from a pool of content with different keys, tempos, or stem content). In the case of advertising, voice-over content in such modular implementations could be combined in a manner similar to that of a song vocal stem. In the case of advertising, data representing the effectiveness of a given advertisement could be collected and/or correlated to the underlying musical content used and/or to the individual current song being segued from. Lastly, as an alternative to audio-only ads, the segue generator of the mixing module 308 or the playback module 310 display may include visual advertising content.

Figure 12:
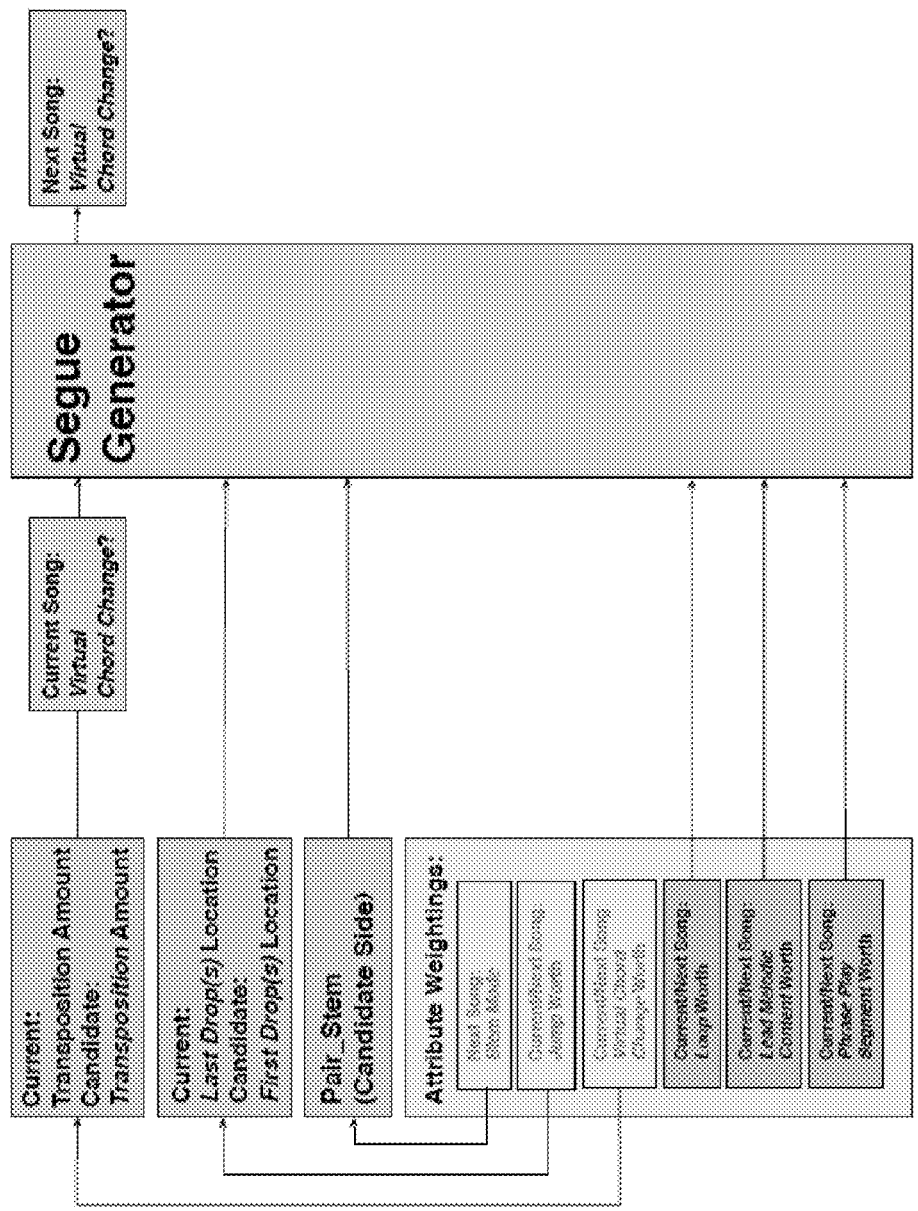
FIG. 12 is a runtime segue generator input.

Finally, the playback module 310 can effectuate the handoff between a current song and a next song in the queue as shown in FIG. 12. Such a handoff of current status from the previous current song to the next song may occur immediately at the completion of the segue scenario and may consist of the following steps:

The system clock is populated by bar/beats from the (new) current song.

The (new) current song metadata is loaded into memory.

The system audio channel, tracks, and any processing used during the playback of the former current song are reset in advance of the determination of a new next song.

The system can then access the (new) current song metadata directly from memory, and returns one or more (based on system configuration) drop points to be used together with the candidate drop points returned by the lookup process to determine the next segue.

In sum, a system according to embodiments of the invention is capable of "listening" to the music as it streams—in other words, like humans do. It is then able musically to modify the music in subtle and not-so-subtle (yet always musical) ways. For the user, this means a completely new, highly enhanced Internet radio listening experience: familiar songs become new and fresh yet again when reshaped in pleasantly unexpected ways, turning passive listeners back into active, engaged listeners. Moreover, when seamlessly overlapped with more familiar material via the ability to create transitions (or "segues"), new and/or unfamiliar songs are made more initially inviting to the listener as well. In short, such a streaming platform would make old songs new again, and make the discovery of new songs more fun.

The system, computer program and computer-implemented method may sell unique "sets" of multiple songs created by the embodiments of the invention as well as via commissions earned on the sale of the original recordings used in those sets (working in partnership with musicians, labels and publishers, the platform would require that the set purchaser also purchase the original recordings on which sets are based—either directly or through major online music retailers).

While the Internet has enabled some innovation in the area of social recommendation-based music services (e.g., Turntable.fm, Last.fm, Pandora), the actual listening experience itself has remained largely unchanged since the advent of terrestrial radio broadcasting nearly 100 years ago: the recorded song remains an immutable and static document presented to the listener sequentially as a series of discrete unrelated events. Once playback is triggered, the system has no further interaction with the song whatsoever.

However, the system may be able to observe and interact with each song on a musical level over time—after "play" has been pressed. What makes this possible is that for every song in its catalog, the platform will have access to metadata representing that song's musical bar/beat grid, harmonic structure (i.e., chord changes), and multiple alternate start/stop/repeat (loop) locations. Together, this data constitutes a song's musical 'fingerprint'—and having access to it allows the platform a degree of musical awareness never before implemented in a music streaming platform:

Temporal Awareness: Embodiments of the invention are able to process music as it flows by in time not in terms of absolute minutes and seconds, but in terms of musical bars and beats. It is also aware of (and can randomly access) musically relevant sections, phrases, and "hooks" within a song.

Harmonic Awareness: For any (bar/beat) location within a song, the platform knows what the current chord is. The platform can therefore infer what other content (i.e., either other sections of the same song or sections from the song to be played) would be harmonically compatible at that particular bar/beat location. For example, harmonic content, or an array of time-stamped (or more accurately, beat-stamped) metadata points representing the harmonic content of a content object at any given point in time—in other words, the content object's "chord changes," may be mapped.

Embodiments of the invention may prepare a song for the system by tagging the beat bar locations and harmonic phrases with the metadata. At runtime, the platform is then able to draw upon an awareness of the current musical context to execute musically satisfying segues (transitions) between songs, make playlist decisions, and alter song forms. The platform will also be capable of subtly altering tempo and pitch when needed to enhance musical cohesion. What will make these operations even more musically satisfying is that for as many songs in its catalog as possible, the platform will have access to not only the complete "master" recording, but also to one or more of that song's isolated constituent elements. In music production terms, these elements are referred to as "stems" (for example, the lead vocal, drums, keyboard, or bass parts). This makes it possible to replace the drums of one song with a different beat in the same tempo (perhaps the looped drums of the next song, serving as an overlapping segue/extended intro)—or to repeat the essential vocal "hook" of a song periodically as the rest of the song drops out and is replaced by otherwise non-related backing parts in the correct key. In a sense, the temporal (bar/beat) awareness and the ability to segue between songs and change their form can be thought of as representing the platform's "horizontal" granularity—while the harmonic awareness and ability to choose between stems represent the platform's "vertical" granularity.

Embodiments of the invention include a music-aware real-time decision engine responsible for dynamically evaluating what, when and how to present content. Decisions may be arrived at by applying proprietary algorithms to song metadata and then constraining the outcome to ensure musical cohesiveness in terms of tempo and harmony. With each song's bar/beat grid already defined in metadata, beat matching across multiple songs becomes a relatively simple task—however, the musically pleasing matching of harmonic content across multiple songs while involving the minimum amount of pitch transposition will require that the decision engine include a certain amount of logic based on basic music theory. However, to the user passively listening to a system-powered music streaming service or artist website via his/her web browser or mobile app, none of this complexity will be visible. Since the value proposition of the platform will ultimately depend simply on how satisfying the listening experience is, the implementation of the decision engine—the "baking in" of innate musicality is taken into account by the embodiments of the invention. Variables used by the system include:

Randomness. The amount of random (non-deterministic) behavior incorporated within the decision engine is a variable: at a minimum, the platform could execute a predefined playlist, altering content only subtly according to a limited set of predefined "performance templates." At the other extreme, the platform could be considered almost an equal partner in the production of the recording, affecting the content in more adventurous and playful (yet always musical) ways, based on higher degrees of randomness.

User Interaction: As a consumer-facing technology, the listening experience should be as passive (i.e., non-geeky) as possible in some embodiments. Still, some simple UI controls could also be presented to the user. Two examples:

A "Like' button: For example, such a feature could provide a valuable feedback channel to the decision engine, allowing it to "learn," and rank specific operations on specific songs based on how pleasing they were to the listener.

A single slider controlling the amount of song overlap during segues and/or the likelihood of (internal) song form alteration. For example, if users are comfortable actively altering their media—as long as the results are compelling and the user interface is simple, inviting, and fun.

For popular music having rhythms that are digitally generated (and therefore digitally precise) (e.g., electronic dance music, hip-hop, etc.), the harmonic structures tend to be relatively simple and relatively static, and 4 and 8 bar phrases are ubiquitous. These are all characteristics that make current popular music particularly well suited to the embodiments of the invention. For example, in some embodiments, the song metadata may include the overall key of a song, and the individual chords as they change within a song. This allows the platform to make harmonically informed decisions during the playing of the song itself. As previously mentioned, each song will have been pre-tagged with a set of optional start, stop, and "loop" bar/beat locations. Having random access to these locations also an improvement over a human DJ in terms of changing or extending a song form on the fly. Moreover, as previously mentioned, for as many songs in its catalog as possible, embodiments of the invention will have access to something a DJ does not: a selection of that song's isolated constituent elements (stem content).

Some embodiments of the invention may also include a "mashup" tool. Although some embodiments of the invention (especially with the inclusion of stem content) would indeed allow for the complete "mashing up" of multiple songs into an entirely new song, other embodiments focus instead on the creation of seamless segues between songs and subtle alteration of song form. There are several reasons for this approach: as musically compelling as the decision engine algorithms will be, on a purely aesthetic level it is believed that a more drastic complete mashup of several songs into an entirely new one is frankly beyond the scope of what can be described in an algorithm and automated; from both an aesthetic and artist brand value perspective, limiting any overlapping of content from multiple songs to a relatively short segue/transition period between songs will help maximize buy-in from content stakeholders (i.e., artists, publishers, and labels); a complete mashing up of multiple songs would require the licensing of the constituent short samples in isolation from the original song's complete recording. In recent years, such licensing has become prohibitively expensive (as can be seen within the hip-hop genre, where the once ubiquitous practice has virtually disappeared).

In some embodiments, a music service offers a single proprietary-format binary file for purchase (either from download or for storage in a cloud media locker). This file may contain both audio and metadata generated by the system for one song or two or more songs bundled together for sale. The user plays this file back with a software program, such as an application for an iPhone or computer that may work in conjunction with a cloud, which implements the modules described above. As such, the songs contained within one such file may be added to a store of files previously downloaded or purchased, resulting in an expanding library of dynamically interactive song content owned by the user.

Figure 13:
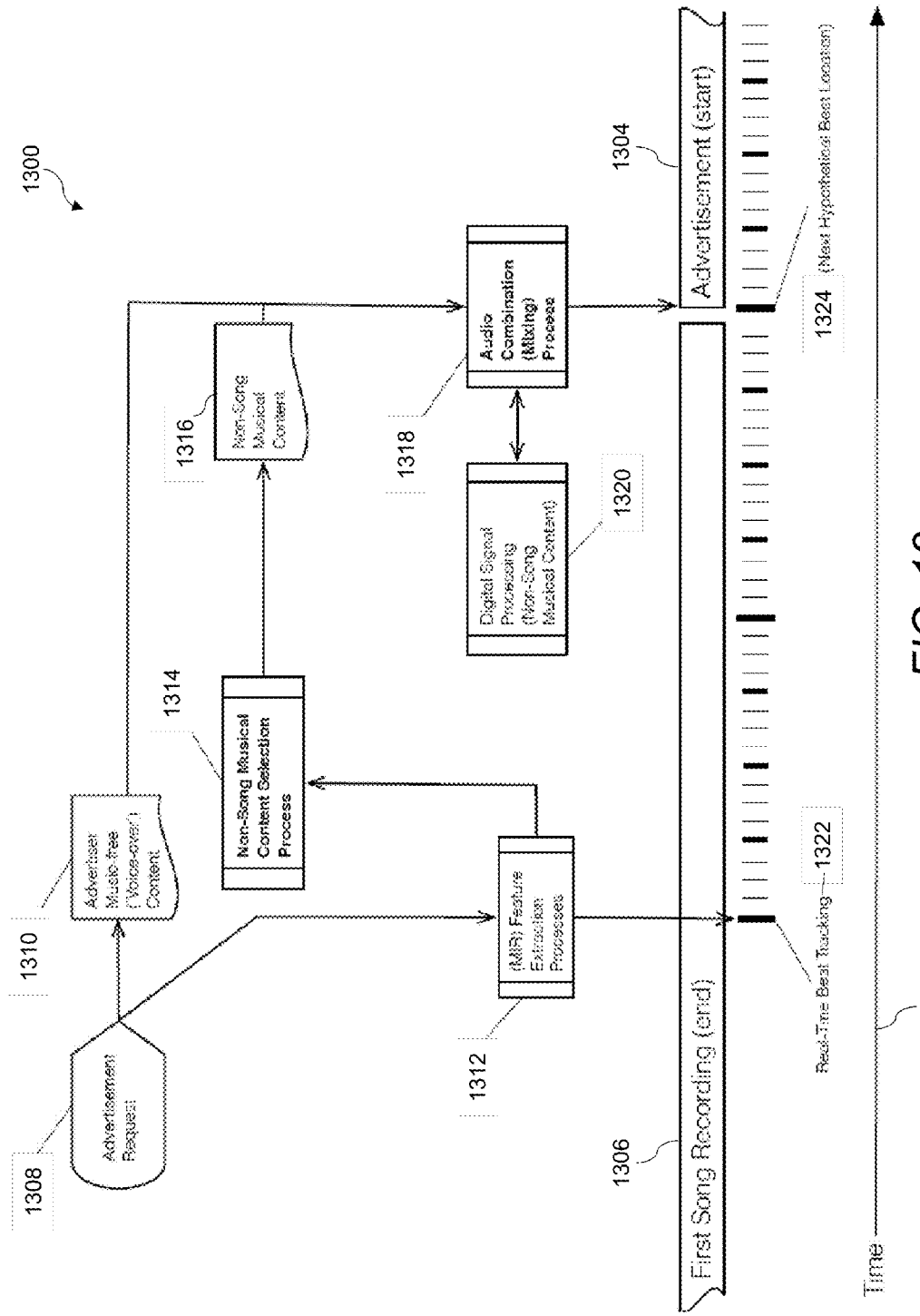
FIG. 13 is a chart illustrating operations related to creating and presenting an advertisement.

FIG. 13 is a chart illustrating operations related to creating and presenting an advertisement. The chart 1300 may be time-based (as shown by the arrow 1302 at the bottom of the figure), where the chart 1300 shows a process for creating/presenting an advertisement 1304, e.g., an audio advertisement, from the initial request for the advertisement 1304 to the triggering of the advertisement 1304 relative to a preceding song recording, e.g., the first song recording 1306 shown in the figure.

The process shown in the chart 1300 may begin with an advertisement request 1308. The advertisement request 1308 may originate from a player client during the first song recording 1306, e.g., a player client of a radio broadcast or of a streaming audio service.

The process shown in the chart 1300 may include accessing a voice-over content item 1310, e.g., a non-musical/music-free advertiser-created content item. The voice-over content item 1310 may be associated with an advertiser that purchased the advertisement 1304 or that purchased a timeslot to play the advertisement 1304.

The process shown in the chart 1300 may include executing a music information retrieval (MIR) feature extraction process 1312, which can include key/mode detection and beat tracking.

The process shown in the chart 1300 may include selecting a non-song musical content item selection process 1314 to select a non-song musical content item 1316 as described herein. The non-song musical content item 1316 may be selected based on a musical similarity (e.g., genre) to the first song recording 1306. The non-song musical content item 1316 may also or instead be selected based on its genre, e.g., the genre of the non-song musical content item 1316 relative to a preferred genre for a listener or a genre of the first song recording 1306. The non-song musical content item 1316 may also or instead be selected based on when it was last presented to a particular user—e.g., recently played non-song musical content items 1316 may not be selected in an aspect.

The process shown in the chart 1300 may include an audio combination (e.g., mixing) process 1318. The process shown in the chart 1300 may also or instead include a digital signal processing (DSP) step 1320, e.g., for the non-song musical content item 1316, where the DSP step 1320 can be done in real time. In the DSP step 1320, the pitch may be shifted to match the key/mode of the first song recording 1306. In the DSP step 1320, the time may be stretched to match the tempo of the first song recording 1306. This DSP step 1320 may be the same or similar to any DSP processes discussed elsewhere herein.

The process shown in the chart 1300 may include triggering the advertisement 1304 after the end of the first song recording 1306. This may include the use of real-time beat tracking 1322 to trigger the advertisement 1304 in musical time at a hypothetical first song beat location 1324 after the end of the first song recording 1306.

Implementations may be utilized with broadcast radio and music services such as a streaming music service or the like (e.g., PANDORA®, SPOTIFY®, and the like). The music service may include a personalized (non-broadcast) service in which individual user musical genre preferences are known to the music service, e.g., via a user account or otherwise through user data. In an aspect, the selection of a musical genre for the non-song musical content item is based on an individual user's musical genre preferences. In terms of weighting, the amount to which an individual user's musical genre preference(s) (which can be thought of as a 'static' genre) may be weighted relative to the musical genre of a current song being streamed (i.e., a preceding song, e.g., where the genre of this song can be thought of as a 'dynamic' genre because it can change dependent on the preceding song) may be widely variable, e.g., between 0 and 100%. Also, the amount to which the individual user's musical genre preferences may be weighted relative to the musical genre of a current song being streamed may be defined by the music service or by the user, e.g., through a user interface of the music service or otherwise.

In general, the process shown in the chart 1300 may be used to present an advertisement to a listener of musical content in a manner that minimizes any perceived discontinuity by a listener from a preceding song, thus increasing the effectiveness of the advertisement and promoting user retention. To this end, the non-song musical content item (i.e., accompanying music expressly created for advertisements) may be selected based on its similarity to a preceding song (e.g., a song played on a music streaming service), and then combined with a voice-over content item (i.e., a spoken advertisement produced without music) to provide the advertisement for presentation sequentially after the song. Implementations may thus include a multi-step process using modular components (i.e., the non-song musical content item and the non-musical voice-over content item) for creating the advertisement. In this manner, implementations may provide an advantageous flexibility. For example, using an implementation, one day a user can be listening to a Taylor Swift song followed by a spoken-word advertisement for car insurance (i.e., the voice-over content item) with a pop music background (i.e., the non-song musical content item), and another day the user can be listening to a Kanye West song followed by an advertisement including the same spoken words but with a hip-hop music background, thus enabling moment-based/mood-based advertising.

Figure 14:
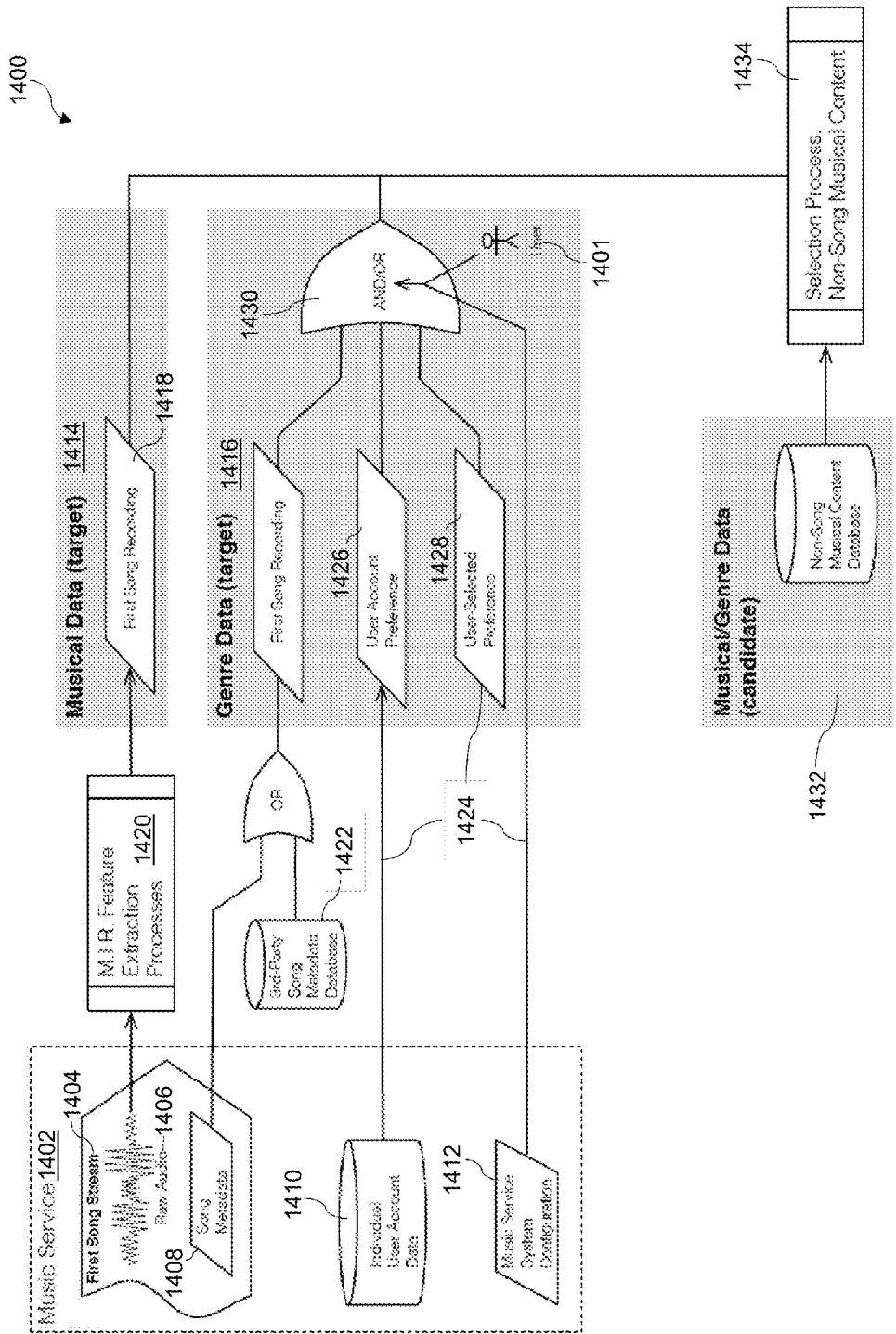
FIG. 14 shows data flow in a system for following a first song with an advertisement.

FIG. 14 shows data flow in a system for following a first song with an advertisement. In general, the figure shows criteria for the election of a non-song musical content item as the result of a comparison of data. This data may include empirical musical data such as data related to a harmonic key (and/or a mode), a tempo, as well as 'softer' data such as data related to a musical genre. In general, the system 1400 shown in the figure demonstrates how this data may be generated and/or accessed according to an implementation.

The system 1400 may be implemented through a music service 1402, such as a streaming music service or the like. The music service 1402 may thus include a non-broadcast service that streams music (e.g., songs) to a music device for use by a user 1401. In particular, the music service 1402 may provide a first song stream 1404, which can include raw audio 1406 and song metadata 1408 for the first song.

The streaming music service 1402 may further include user account data 1410, e.g., for the user 1401, and system configuration information 1412.

The system 1400 may include 'target' data, such as musical data 1414 and genre data 1416. The target data may represent contextual data. For example, in the case of musical data 1414, the target data may include one or more of a tempo, a harmonic key (and/or a mode) of a song recording (e.g., the first song recording 1418 shown in the figure) playing prior to an interstitial audio advertisement. The musical data 1414 may be the result of real-time key/mode detection and beat tracking (e.g., MIR feature extraction processes 1420 shown in the figure) running on the raw audio 1406 of the first song stream 1404. In an aspect, beat tracking may provide tempo via simple arithmetic as known in the art.

The genre data 1416 for a song that is currently playing by the music service 1402 (e.g., the first song recording 1418) may be available in the song metadata 1408 (e.g., the music service stream metadata). The genre data 1416 may also or instead be obtained through third-party music metadata 1422 provide by a third-party service or the like.

The target genre data may also or instead be obtained by other means such as those indicated by reference numeral 1424.

By way of example, in cases where a personalized (non-broadcast) music service 1402 has individual user account data 1410, a user account preference 1426 (e.g., a genre preference) contained within this user account data 1410 can be considered when selecting non-song musical content for the audio advertisement.

In some embodiments (e.g., broadcast radio), the user 1401 can manually and dynamically provide a user-selected preference 1428, e.g., by selecting an 'advertisement music genre preference.' The user-selected preference 1428 may be independent of any other user account preferences 1426.

One or more 'target' genre data sources (as shown in the genre data 1416 in the figure) may be used for comparison against 'candidate' (non-song musical content item) genres (e.g., shown in the database 1432 in the figure). Target genre metadata source(s) may be configured by the music service 1402 (e.g., through the music service system configuration 1412 shown in the figure) or selected by the user 1401. In embodiments in which multiple target genre sources are defined, the probability of a single target genre data source being chosen for use may be weighted. For example, an 80% weighting of the first song genre data source would result in 8 out of 10 instances in which the first song genre would be used as the target genre. Any weighting scale/system known in the art may also or instead be used. Weighting of multiple target genre metadata source(s) may be configured by the music service 1402 or selected by the user 1401.

A pool of non-song musical content may be disposed in a database 1432. The non-song musical content may be curated and pre-tagged with corresponding 'candidate' key/mode, tempo, and genre data. This database 1432 may be used for the selection process 1434 of the non-song musical content to be combined with a voice-over content item to create the audio advertisement.

Figure 15:
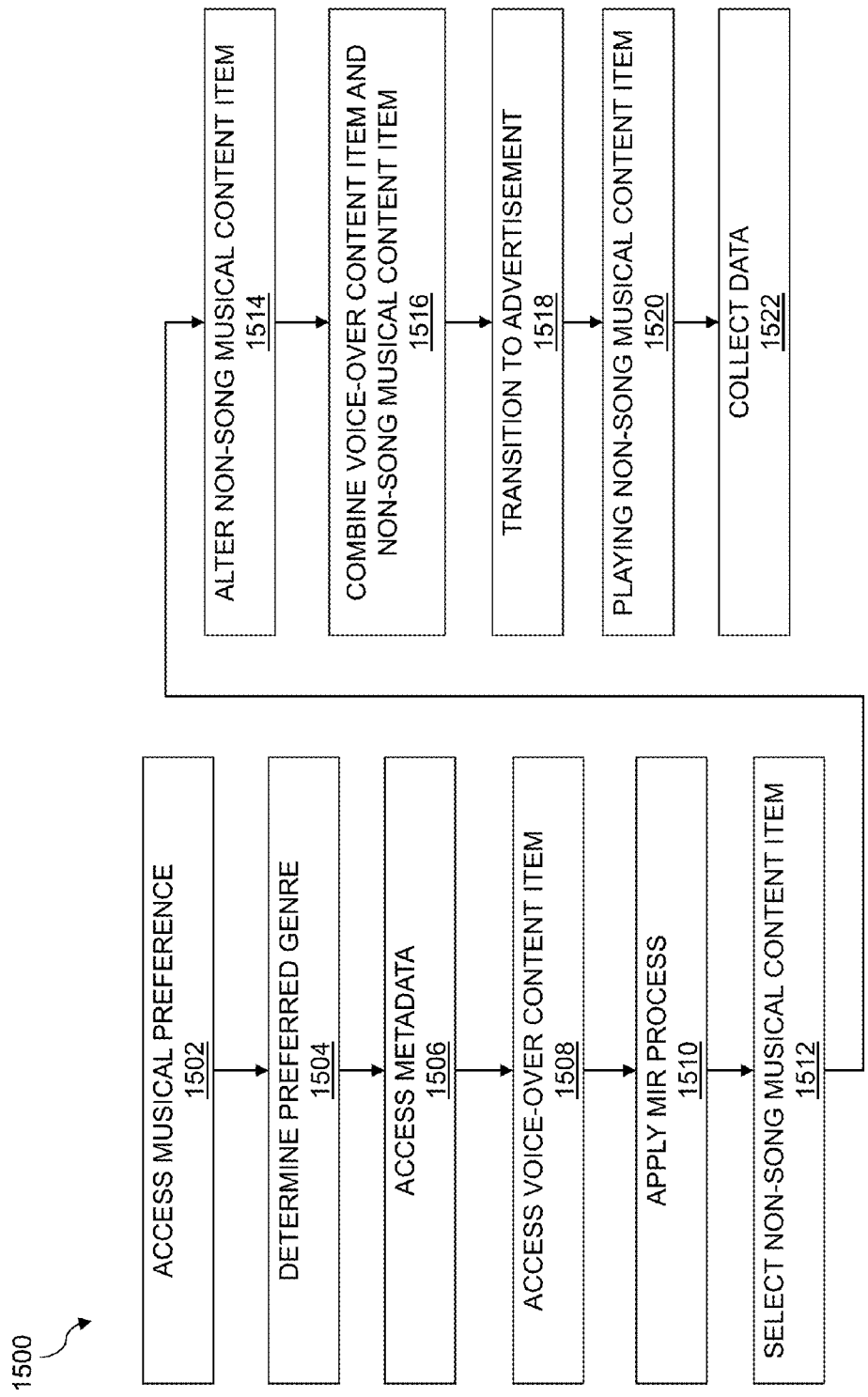
FIG. 15 is a flow chart of a method for following a first song with an advertisement.

FIG. 15 is a flow chart of a method for following a first song with an advertisement. The method 1500 may be used, for example, in providing audio advertisements for a music streaming service or the like. The method 1500 may be implemented on a computer program product for following a first song with an advertisement, where the computer program product comprises computer executable code stored in a non-transitory memory that, when executing on one or more computing devices, performs the steps of the method 1500. The computer program product may include, or be part of a system that includes, a first database of non-song musical content items, where the non-song musical content items have different keys, tempos, or genres.

As shown in step 1502, the method 1500 may include accessing a musical preference of a user of a music service. The musical preference may include a preferred genre of music for the user.

As shown in step 1504, the method 1500 may include determining the preferred genre of music for the user, e.g., through an analysis of account data for the user. The account data may include music service account data, or account data retrieved from other sources. The preferred genre of music for the user may also or instead be selected by the user.

As shown in step 1506, the method 1500 may include accessing metadata for a first song being played through the music service on a music playback device (e.g., a digital music player selected from a group consisting of a desktop computer, a laptop computer, a personal digital assistant, a cellular telephone, a computer tablet, and a networked computer display). Accessing metadata may include retrieving a genre of the first song from song genre metadata for the first song.

As shown in step 1508, the method 1500 may include accessing a voice-over content item created for use in advertisements to follow songs played through the music service. The voice-over content item may include a spoken advertisement produced without music, and thus the voice-over content item may be non-musical.

As shown in step 1510, the method 1500 may include applying a music information retrieval (MIR) process for determining a similarity between the first song and a non-song musical content item. The MIR process may include one or more of a bar/beat grid detection routine, a key detection routine, a mode detection routine, and a chordal harmony detection routine.

As shown in step 1512, the method 1500 may include selecting a non-song musical content item for use in an advertisement. The non-song musical content item may be selected from a database that stores a plurality of non-song musical content items, e.g., the first database described above. The non-song musical content item may include accompanying music expressly created for advertisements. The non-song musical content item may also or instead include a short musical sound logo or mnemonic.

The non-song musical content item may be selected based on one or more of (i) a similarity between the first song and the non-song musical content item, and (ii) a musical preference of the user. The similarity between the first song and the non-song musical content item may relate to one or more of a key, a tempo, and a genre. The similarity between the first song and the non-song musical content item may also or instead be based on a key or mode determined by a 6-note scale.

In an aspect, selecting the candidate non-song musical content item includes a comparison of a genre of the non-song musical content item to one or more target genres (e.g., the preferred genre of music for the user and a genre of the first song). This may include weighting the probability that a single target genre will be used for any one given advertisement instance. For example, an 80% weighting of the preferred genre of music for the user would result in 8 out of 10 instances in which the preferred genre of music for the user would be used as the target genre. This weighting may be configurable by one or more of the music service and the user. Thus, the comparison may include utilizing one or more of (i) a first weight related to a similarity of the genre of the non-song musical content item to the genre of the first song and (ii) a second weight related to a similarity of the genre of the non-song musical content item to the preferred genre of music for the user.

By way of another example, the weighting may also or instead include a weighting based on a comparison of the similarities of one or more of (i) the genre of the non-song musical content item to the genre of the first song and (ii) the genre of the non-song musical content item to the preferred genre of music for the user. This comparison may include reconciling a first weight related to a similarity of the genre of the non-song musical content item to the genre of the first song with a second weight related to a similarity of the genre of the non-song musical content item to the preferred genre of music for the user. In an aspect, one or more of the first weight and the second weight is configurable by one or more of the music service and the user.

As shown in step 1514, the method 1500 may include altering the non-song musical content item, e.g., such that it is harmonically continuous in terms of key or mode to the first song.

As shown in step 1516, the method 1500 may include combining the voice-over content item and the non-song musical content item into an advertisement for playback after the first song. In an aspect, the advertisement further includes visual advertising content.

As shown in step 1518, the method 1500 may include transitioning to the advertisement, which can occur in response to determining that the first song is at or near its end of playback. Transitioning to the advertisement may include providing rhythmic continuity by playing the non-song musical content item and the voice-over content item immediately and contiguously following an end portion of the first song. Transitioning to the advertisement may also or instead include a pitch-shifting of the non-song musical content item in real time by a minimum amount necessary to relate harmonically to the first song. Transitioning to the advertisement may also or instead include time-stretching the non-song musical content item to match a tempo of the first song in real time.

As shown in step 1520, the method 1500 may include playing the non-song musical content item immediately and contiguously following an end of the first song, e.g., such that the non-song musical content item is rhythmically continuous in terms of tempo to the first song.

As shown in step 1522, the method 1500 may include collecting data representing an effectiveness of the advertisement and correlating the data to at least one of the non-song musical content item and the first song.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for following a first song with an advertisement, the computer program product comprising computer executable code stored in a non-transitory memory that, when executing on one or more computing devices, performs the steps of:
    accessing a musical preference of a user of a music service, the musical preference including a preferred genre of music;
    accessing metadata for a first song being played through the music service on a music playback device;
    accessing a voice-over content item created for use in advertisements to follow songs played through the music service, the voice-over content item including a spoken advertisement produced without music;
    selecting a non-song musical content item for use in an advertisement based on one or more of (i) a similarity between the first song and the non-song musical content item, and (ii) the musical preference of the user, the non-song musical content item including accompanying music expressly created for advertisements;
    combining the voice-over content item and the non-song musical content item into an advertisement for playback after the first song; and
    in response to determining that the first song is at or near its end of playback, transitioning to the advertisement.

2. The computer program product of claim 1 wherein selecting the non-song musical content item includes a comparison of a genre of the non-song musical content item to one or more of the preferred genre of music for the user and a genre of the first song.

3. The computer program product of claim 2 wherein the comparison includes utilizing one or more of a first weight related to a similarity of the genre of the non-song musical content item to the genre of the first song and a second weight related to a similarity of the genre of the non-song musical content item to the preferred genre of music for the user.

4. The computer program product of claim 3 wherein one or more of the first weight and the second weight is configurable by one or more of the music service and the user.

5. The computer program product of claim 2 wherein accessing metadata includes retrieving the genre of the first song from song genre metadata for the first song.

6. The computer program product of claim 1 further comprising determining the preferred genre of music for the user through an analysis of account data for the user.

7. The computer program product of claim 1 wherein the preferred genre of music for the user is selected by the user.

8. The computer program product of claim 1 wherein transitioning to the advertisement includes providing rhythmic continuity by playing the non-song musical content item and the voice-over content item immediately and contiguously following an end portion of the first song.

9. The computer program product of claim 1 further comprising applying a Music Information Retrieval (MIR) process including one or more of a bar/beat grid detection routine, a key detection routine, a mode detection routine, and a chordal harmony detection routine to determine the similarity between the first song and the non-song musical content item.

10. The computer program product of claim 1 wherein transitioning to the advertisement includes a pitch-shifting of the non-song musical content item in real time by a minimum amount necessary to relate harmonically to the first song.

11. The computer program product of claim 1 wherein transitioning to the advertisement includes time-stretching the non-song musical content item to match a tempo of the first song in real time.

12. The computer program product of claim 1 wherein the similarity between the first song and the non-song musical content item relates to one or more of keys, tempos, and genre.

13. The computer program product of claim 1 further comprising a first database of non-song musical content items, wherein the non-song musical content items have different keys, tempos, or genres, and wherein the selected non-song musical content item is stored in the first database.

14. The computer program product of claim 1 further comprising playing the non-song musical content item immediately and contiguously following an end of the first song to be rhythmically continuous in terms of tempo to the first song.

15. The computer program product of claim 1 further comprising altering the non-song musical content item to be harmonically continuous in terms of key or mode to the first song.

16. The computer program product of claim 1 wherein the non-song musical content item includes a short musical sound logo or mnemonic.

17. The computer program product of claim 1 wherein the music playback device includes a digital music player selected from a group consisting of a desktop computer, a laptop computer, a personal digital assistant, a cellular telephone, a computer tablet, and a networked computer display.

18. The computer program product of claim 1 further comprising collecting data representing an effectiveness of the advertisement and correlating the data to at least one of the non-song musical content item and the first song.

19. The computer program product of claim 1 wherein the similarity between the first song and the non-song musical content item is based on a key or mode determined by a 6-note scale.

20. The computer program product of claim 1 wherein the advertisement includes visual advertising content.

* * * * *